(12) United States Patent
Miyazaki

(10) Patent No.: US 8,970,630 B2
(45) Date of Patent: Mar. 3, 2015

(54) INFORMATION PROCESSING DEVICE, INFORMATION PROCESSING METHOD, AND INFORMATION PROCESSING PROGRAM

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 860 days.

(21) Appl. No.: 12/770,390

(22) Filed: Apr. 29, 2010

(65) Prior Publication Data

US 2011/0134126 A1      Jun. 9, 2011

(30) Foreign Application Priority Data

Dec. 5, 2009    (JP) ................................ P2009-115862

(51) Int. Cl.
*G09G 5/00* (2006.01)
*G06F 3/0488* (2013.01)
(Continued)

(52) U.S. Cl.
CPC .......... *G06F 3/04883* (2013.01); *G06F 3/0485* (2013.01); *G06F 3/0482* (2013.01); *G06F 3/04886* (2013.01); *G06F 2203/04806* (2013.01); *G06F 2203/04808* (2013.01)
USPC ........... 345/660; 345/173; 715/784; 715/786; 715/788; 715/800; 715/804; 701/418; 701/455

(58) Field of Classification Search
CPC .......................... G09G 2340/0407; G06T 3/40
USPC .......... 345/660, 173; 715/784, 786, 788, 800, 715/804; 701/418, 455
See application file for complete search history.

(56) References Cited

U.S. PATENT DOCUMENTS 7,551,187 B2 *   6/2009   Agrawala et al. .............. 345/667
7,693,912 B2 *   4/2010   Rose et al. ..................... 707/779
(Continued)

FOREIGN PATENT DOCUMENTS

EP          1868080         12/2007
JP          09-033278       2/1997
(Continued)

OTHER PUBLICATIONS

Parisa Eslambolchilar, John Williamson, Rod Murray-Smith, "Multimodal Feedback for Tilt Controlled Speed Dependent Automatic Zooming (2004)", In: UIST'04: Proceedings of the 17th annual ACM symposium on User interface software and technology.*
(Continued)

*Primary Examiner* — Devona Faulk
*Assistant Examiner* — Jin Ge
(74) *Attorney, Agent, or Firm* — Sherr & Jiang, PLLC

(57) ABSTRACT

An information processing device includes: an operation recognition part that recognizes a user operation for a display screen of a display unit; a determination part that determines whether the user operation recognized by the operation recognition part is an operation starting from within a predetermined region of the display screen or not; and a control part that scrolls information being displayed on the display screen while changing a level of detail of the information if the determination part determines that the user operation is the operation starting from within the predetermined region in response to the user operation, and performs changing of the level of detail of the information or scrolling of the information if the determination part determines that the user operation is not the operation starting from within the predetermined region in response to the user operation.

23 Claims, 12 Drawing Sheets

(51) Int. Cl.
*G06F 3/0485* (2013.01)
*G06F 3/0482* (2013.01)
*G06F 3/041* (2006.01)
*G06F 3/048* (2013.01)

(56) References Cited

U.S. PATENT DOCUMENTS

| | | | |
|---|---|---|---|
| 8,103,439 B2* | 1/2012 | Onishi et al. | 701/410 |
| 2004/0160458 A1* | 8/2004 | Igarashi et al. | 345/660 |
| 2006/0290678 A1* | 12/2006 | Lii | 345/173 |
| 2007/0226646 A1* | 9/2007 | Nagiyama et al. | 715/784 |
| 2007/0300151 A1* | 12/2007 | Araki et al. | 715/513 |
| 2008/0235616 A1* | 9/2008 | Neervoort | 715/784 |
| 2008/0243375 A1* | 10/2008 | Han | 701/208 |
| 2008/0288166 A1* | 11/2008 | Onishi et al. | 701/209 |
| 2010/0023858 A1* | 1/2010 | Ryu et al. | 715/702 |
| 2010/0053221 A1* | 3/2010 | Kaneko et al. | 345/684 |
| 2010/0134425 A1* | 6/2010 | Storrusten | 345/173 |
| 2010/0299638 A1* | 11/2010 | Choi | 715/835 |
| 2011/0025627 A1* | 2/2011 | Sakai | 345/173 |

FOREIGN PATENT DOCUMENTS

| | | |
|---|---|---|
| JP | 09-050235 | 2/1997 |
| JP | 10-268759 | 10/1998 |
| JP | 11-327433 | 11/1999 |
| JP | 2000-241170 | 9/2000 |
| JP | 2002-081942 | 3/2002 |
| JP | 2002-323850 | 11/2002 |
| JP | 2002-358162 | 12/2002 |
| JP | 2005-062043 | 3/2005 |
| JP | 2007-108841 | 4/2007 |
| JP | 2008-145169 | 6/2008 |
| JP | 2009-036881 | 2/2009 |
| JP | 2009-098086 | 5/2009 |
| WO | WO2007/043230 | 4/2007 |
| WO | WO 2007/114067 | 10/2007 |

OTHER PUBLICATIONS

A. Wallace, "The Calibration and Optimisation of Speed-Dependent Automatic Zooming," University of Canterbury, Christchurch, New Zealand Nov. 2003.*

J. Savage, "The Calibration and Evaluation of Speed-Dependent Automatic Zooming Interfaces," A Thesis of Master of Science in Computer Science, University of Canterbury, 2004.*
Andy Cockburn, Amy Karlson, Benjamin B. Bederson "A Review of Focus and Context Interfaces", 2006 ACM 1072-0516.*
Andy Cockburn, Amy Karlson, Benjamin B. Bederson,"A Review of Overview+Detail, Zooming, and Focus+Context Interfaces", 2007 ACM 1073-0516.*
A. Cockburn, J. Looser, and J. Savage, "Around the World in Seconds with Speed-Dependent Automatic Zooming," in Demonstration in the Proceedings of the ACM User Interface Software and Technology (UIST Conference Supplement), Vancouver, Canada, 2003, pp. 35-36.*
A. Cockburn and J. Savage, "Comparing Speed-Dependent Automatic Zooming with Traditional Scroll, Pan, and Zoom Methods," in People and Computers XVII: British Computer Society Conference on Human Computer Interaction, Bath, England, 2003, pp. 87-102.*
Bradley M. Hemminger, Anne Bauers, and Jian Yang, "Comparison of Navigation Techniques for Large Digital Images", Journal of Digital Imaging, vol. 21, Suppl 1, 2008: pp. S13YS38.*
Patrick Chiu, Koichi Fujii, Qiong Liu,"Content Based Automatic Zooming: Viewing Documents on Small Displays", ACM Multimedia 2008.*
Schoor, W., F. Bollenbeck, M. Hofmann, R. Mecke, U. Seiffert, and B. Preim. Automatic Zoom and Pseudo Haptics to Support Semiautomatic Segmentation Tasks. In WSCG2008 Full Papers Proceedings, 2008.*
J. Savage, "Speed-dependent automatic zooming," University of Canterbury, 2002.*
Timo Partala, Mika Luimula, Ossi Saukko, "Automatic rotation and zooming in mobile roadmaps", Proceeding MobileHCI '06 Proceedings of the 8th conference on Human-computer interaction with mobile devices and services pp. 255-258.*
Steve Jones Matt Jones Gary Marsden Dynal Patel Andy Cockburn, "An Evaluation of Integrated Zooming and Scrolling on Small-Screens" Journal International Journal of Human-Computer Studies archive vol. 63 Issue 3, Sep. 2005 pp. 271-303.*
Igarashi, T., et al., "Speed-dependent Automatic Zooming for Browsing Large Documents", 12 pages.
Hinckley, K., "Speed-dependent Automatic Zooming for Efficient Document Navigation", WISS, 10 pages, (2000).
Nov. 20, 2012, Office Action issued in related JP Patent Application No. 2009-115862.
Jun. 3, 2014, Extended European Search Report for related EP application No. 10157615.5.

* cited by examiner

FIG.2
CHANGING OF LEVEL OF DETAIL OF MAP INFORMATION
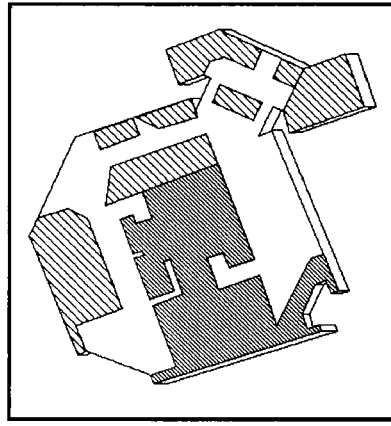
MAP — PM
AERIAL PHOTO — PS
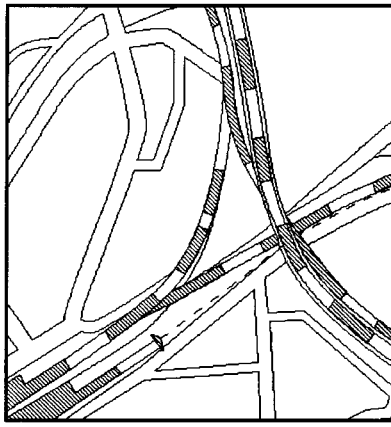
DETAILED MAP — PC
(−) LOWER LEVEL OF DETAIL → (+) HIGHER LEVEL OF DETAIL

MAP SCREEN (1)

20

MAP SCREEN (2)

FUNCTIONAL CONFIGURATION OF INFORMATION PROCESSING DEVICE

MOCHI-CURSOR DISPLAY PROCESSING PROCEDURE

CONFIGURATION OF INFORMATION PROCESSING DEVICE IN THIRD EMBODIMENT

FOLDER STRUCTURE OF MUSIC-RELATED INFORMATION

CHANGING OF LEVEL OF DETAIL OF MUSIC-RELATED INFORMATION

MUSIC SELECTION SCREEN

30

IMAGE VIEW SCREEN

40

INFORMATION PROCESSING DEVICE, INFORMATION PROCESSING METHOD, AND INFORMATION PROCESSING PROGRAM

BACKGROUND OF THE INVENTION

1. Field of the Invention

The present invention relates to an information processing device, an information processing method, and an information processing program, and is suitable for application to display of information on a display screen, for example.

2. Background Art

In related art, information processing devices are adapted to perform zooming for enlarging or reducing an image being displayed on a display screen of a display unit and scrolling the image in response to user operation.

Such information processing devices are adapted to perform zooming of an image, for example, when a user performs touch operation on the display screen, in response to the touch operation. Further, the information processing devices are adapted to perform scrolling of an image, for example, when a user performs operation of moving the user's finger with the finger remaining touching the display screen (hereinafter, this is also referred to as "drag operation"), in response to the drag operation.

Here, it may be convenient and easy for users, when looking for a desired location in an image having a large plane like a map, for example, to perform zooming and scrolling of the image at the same time.

Accordingly, information processing devices in which not only scrolling of an image but also zooming of the image can be performed at the same time only through drag operation by an user have been proposed (e.g., see Takeo Igarashi, Ken Hinckley, *Speed-dependent Automatic Zooming for Efficient Documentation Navigation*, [Online], December 2000, Workshop on Interactive Systems and Software VIII, Japan Society for Software Science and Technology, [searched on Mar. 10, 2009], Internet URL:http://www-ui.is.s.u-tokyo.ac.jp/~takeo/papers/wiss2000.pdf>), and Takeo Igarashi, Ken Hinckley, *Speed-dependent Automatic Zooming for Browsing Large Documents*, [Online], Nov. 5-8, 2000, 13th Annual Symposium on User Interface Software and Technology, [searched on Mar. 10, 2009], Internet URL: http://www-ui.is.s.u-tokyo.ac.jp/~takeo/papers/uist2000.pdf>. In the information processing devices, while zooming of an image is performed depending on the movement rate of drag operation, scrolling of the image is performed depending on the movement distance, movement direction, and the like of the drag operation.

SUMMARY OF THE INVENTION

However, in the above described information processing devices, though zooming and scrolling can be performed at the same time in response to the drag operation, it is impossible to separately perform zooming and scrolling of the image.

Accordingly, it is conceivable that operability of an information processing device can be further improved if it is possible to selectively perform changing of the level of detail of information being displayed on a display screen such as zooming of an image and scrolling of the information at the same time or separately in response to the user operation.

Thus, there is a need for an information processing device, an information processing method, and an information processing program that can further improve operability.

An information processing device according to an embodiment of the invention includes: an operation recognition part that recognizes a user operation for a display screen of a display unit; a determination part that determines whether the user operation recognized by the operation recognition part is an operation starting from within a predetermined region of the display screen or not; and a control part that scrolls information being displayed on the display screen while changing a level of detail of the information if the determination part determines that the user operation is the operation starting from within the predetermined region in response to the user operation, and performs changing of the level of detail of the information or scrolling of the information if the determination part determines that the user operation is not the operation starting from within the predetermined region in response to the user operation.

Thereby, the information processing device of the embodiment of the invention can selectively perform changing of the level of detail of the information being displayed on the display screen and scrolling of the information at the same time or separately by allowing the user to perform a simple operation of changing the start of the operation.

According to the embodiment of the invention, the changing of the level of detail of the information being displayed on the display screen and the scrolling of the information can be performed at the same time or separately by allowing the user to perform a simple operation of changing the start of the operation. Thus, the information processing device, the information processing method, and the information processing program that can further improve the operability can be realized.

BRIEF DESCRIPTION OF THE DRAWINGS

FIG. 2 is a schematic diagram for explanation of changing of the level of detail of map information in the first embodiment of the invention.

DESCRIPTION OF PREFERRED EMBODIMENTS

As below, the best modes for implementing the invention (hereinafter, referred to as embodiments) will be explained. The explanation will be made in the following order.
1. First Embodiment
2. Second Embodiment
3. Third Embodiment
4. Other Embodiments

1. First Embodiment

1-1. Overall Configuration of Information Processing Device

Figure 1A:
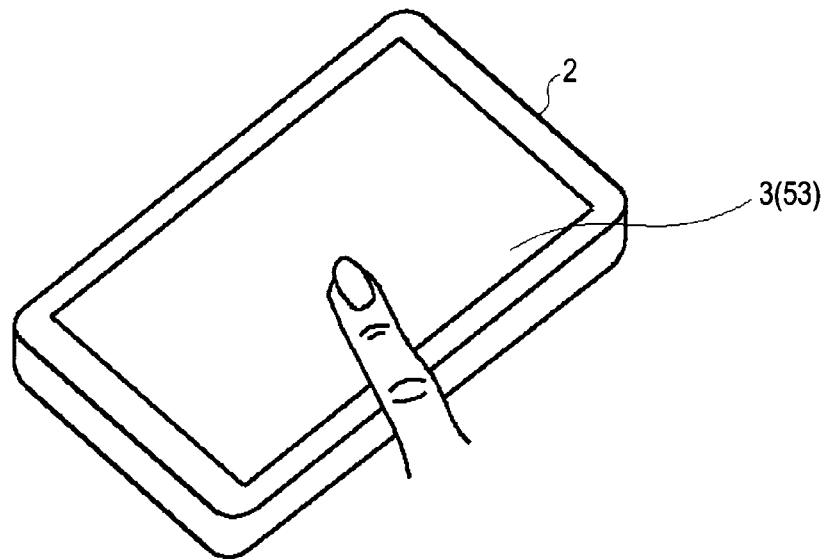
FIGS. 1A and 1B are schematic diagram showing a configuration of an information processing device in the first and second embodiments of the invention.

First, the first embodiment will be explained. In FIG. 1A, 1 denotes an information processing device as a whole. The information processing device 1 is of portable type and has a flat rectangular casing 2 having a size that can be held with one hand (so-called "palm-size") as shown in FIG. 1A.

Figure 1B:
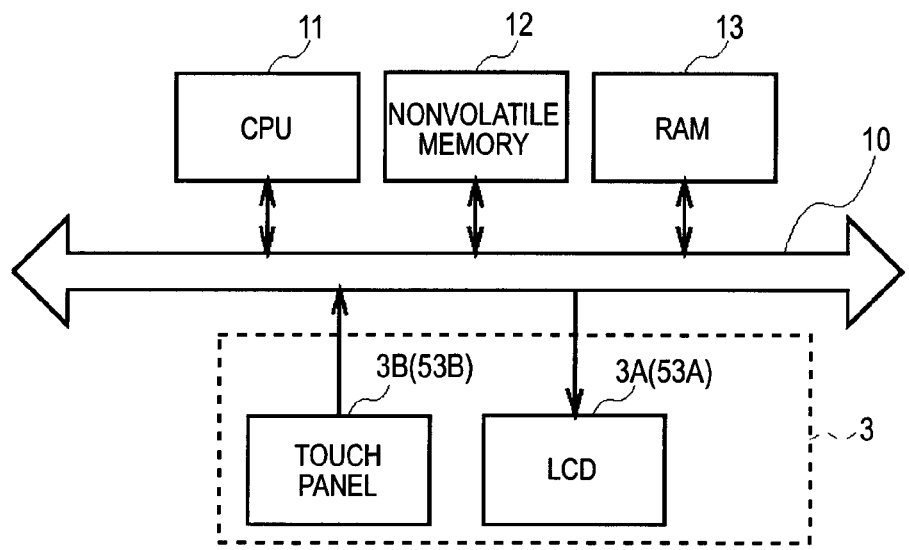

On the surface of the casing 2, a display unit 3 having a rectangular plate shape is provided. The display unit 3 is formed by bonding a transparent touch panel 3B (FIG. 1B) on an LCD (Liquid Crystal Panel) 3A (FIG. 1B).

Subsequently, the respective circuit parts of the information processing device 1 will be explained using FIG. 1B. In the information processing device 1, the respective circuit parts are connected via a bus 10. A CPU 11 reads out programs stored in a nonvolatile memory 12 into a RAM (Random Access Memory) 13. Further, the CPU 11 is adapted to develop the programs on the RAM 13, and control the respective circuit parts according to the developed programs and execute the various kinds of processing.

When a user's finger touches the touch panel 3B, the touch panel 3B sends out the location touched by the user's finger (hereinafter, this is also referred to "touch position") to the CPU 11. Here, the touch panel 3B of capacitance type is used.

The CPU 11 detects the touch position as coordinates within the display screen displayed on the LCD 3A. Then, the CPU 11 is adapted to determine whether a command is associated with the detected coordinates or not, and, if the CPU determines that a command is associated with them, perform various kinds of processing in response to the command.

1-2. Map Information Changing Operation

Next, a map information changing operation in the information processing device 1 will be explained in detail. When an instruction is provided to launch an application of displaying map information by the user operation, the CPU 11 reads out map information data from the nonvolatile memory 12. Then, the CPU 11 allows the LCD 3A to display a map screen 20 (FIG. 3) for displaying map information of an arbitrary region based on the map information data.

The CPU 11 is adapted to scroll the map information displayed on the map screen 20 and change the level of detail of the map information such as the scale of the map information in response to the user operation for the touch panel 3B.

First, here, the changing of the level of detail of the map information in the map screen 20 will be explained using FIG. 2. The CPU 11 reads out the map image data, for example, from the nonvolatile memory 12, and displays a map image PM as the map information on the map screen 20 based on the data.

When an instruction to raise the level of detail of the map information is provided by the user operation, the CPU 11 raises the scale of the map information and displays a map image PM corresponding to the scale in response to the operation.

Further, it is assumed that, as a result of raising the scale of the map information in response to the user operation, the scale of the map information takes a predetermined value, and if an instruction to further raise the level of detail of the map information is provided to the CPU 11 by the user operation. In this regard, the CPU 11 reads out aerial photo image data corresponding to the map image PM being displayed on the map screen 20 from the nonvolatile memory 12, and displays an aerial photo image PS as the map information on the map screen 20 based on the data.

Then, an instruction to raise the level of detail of the map information is provided by the user operation, the CPU 11 raises the scale of the map information and displays an aerial photo image PS corresponding to the scale in response to the operation.

Further, it is assumed that, as a result of raising the scale of the map information in response to the user operation, the scale of the map information takes a predetermined value, and if an instruction to further raise the level of detail of the map information is provided to the CPU 11 by the user operation.

In this regard, the CPU 11 determines whether a facility having a detailed map as an interior map or floor map of the facility is displayed within the map screen 20 or not.

Specifically, in the nonvolatile memory 12, facility information on facilities such as buildings, stations, and entertainment facilities is recorded in correspondence with the map images PM and the aerial photo images PS. The facility information is associated with names of facilities, latitude and longitude information, detailed map data, and the like.

If there is facility information associated with detailed map data in the facility information in correspondence with the aerial photo image PS being displayed on the map screen 20, the CPU 11 determines whether the facility having a detailed map is being displayed within the map screen 20.

Then, if the facility having the detailed map is being displayed within the map screen 20 the CPU 11 reads out the detailed map data corresponding to the facility from the nonvolatile memory 12. Then, the CPU 11 displays the detailed map image PC based on the detailed map data as the map information on the map screen 20.

In this manner, when an instruction to raise the level of detail of the map information is provided by the user operation, the CPU 11 is adapted to raise the scale of the map information and display a map image PM or an aerial photo image PS corresponding to the scale.

Further, when an instruction to raise the level of detail of the map information is provided, if the scale of the map information takes a predetermined value, the CPU 11 is adapted to switch the displayed image from the map image PM to the aerial photo image PS, or from the aerial photo image PS to the detailed map image PC. That is, the CPU 11 is adapted to switch the image as the map information being displayed on the map screen 20 to an image at the higher level of detail than at present.

On the other hand, when an instruction to lower the level of detail of the map information is provided, the CPU 11 is adapted to lower the scale of the map information and display a map image PM or an aerial photo image PS corresponding to the scale.

Further, when an instruction to lower the level of detail of the map information is provided, if the scale of the map information takes a predetermined value, the CPU 11 is adapted to switch the displayed image from the detailed map image PC to the aerial photo image PS, or from the aerial photo image PS to the map image PM. That is, the CPU 11 is adapted to switch the image as the map information being displayed on the map screen 20 to an image at the lower level of detail than at present.

Then, on the map screen 20, the user operation corresponding to changing of the level of detail and scrolling of the map information will be specifically explained.

Figure 3:
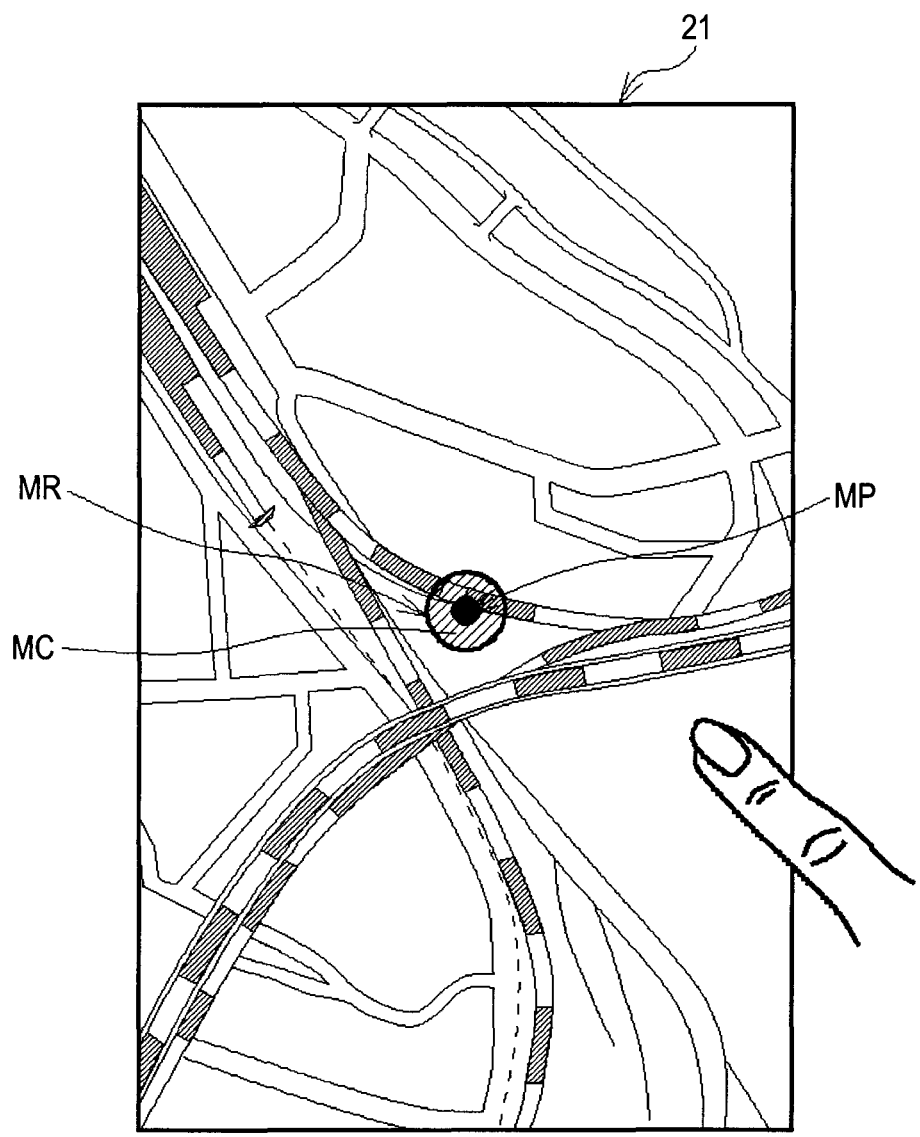
FIG. 3 is a schematic diagram showing a configuration of a map screen (1) in the first embodiment of the invention.

When an instruction is provided to launch an application of displaying map information by the user operation, the CPU 11 allows the LCD 3A to display the map screen 20 shown in FIG. 3.

The map screen 20 includes a map information display region 21 for displaying map information on the entire map screen 20, and a region (hereinafter, also referred to as "mochi-cursor display region") MR for displaying a semi-transparent cursor MC having a circular shape (hereinafter, referred to as "mochi-cursor").

The mochi-cursor display region MR is a circular region having a diameter nearly equal to the thickness of a human finger, for example, around the center of the display screen (hereinafter, also referred to as "screen center") MP of the LCD 3A, and provided within the map information display region 21. The CPU 11 displays the mochi-cursor MC to cover the entire mochi-cursor display region MR. Further, the CPU 11 displays the mochi-cursor MC to be superimposed on the map information so that the map information under the mochi-cursor MC may be seen through.

Figure 4A:
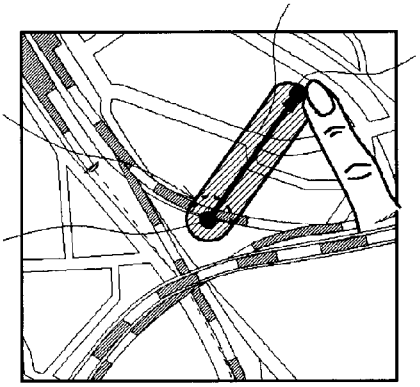
FIGS. 4A to 4F are schematic diagrams for explanation of a map information changing operation in the first embodiment of the invention.

Here, as shown in FIG. 4A, it is assumed that the drag operation starting from a position within the mochi-cursor display region MR is performed by an user in an arbitrary direction (e.g., toward obliquely upper right).

In this regard, when the CPU 11 recognizes that a touch position TP at the start of the drag operation is within the mochi-cursor display region MR via the touch panel 3B, the CPU recognizes that the drag operation starting from the position within the mochi-cursor display region MR has been started. Here, the drag operation starting from the position within the mochi-cursor display region MR is also referred to as "mochi-drag operation".

Then, the CPU 11 displays the mochi-cursor MC extending from the mochi-cursor display region MR to the touch position TP like a rice cake (mochi) according to the movement of the user's finger, i.e., the movement of the touch position TP. In this manner, the CPU 11 is adapted to display the mochi-cursor MC extending or shortening according to the movement of the touch position TP.

Further, the CPU 11 recognizes that an instruction to scroll the map information while changing the level of detail of the map information has been provided, and scrolls the map information while changing the level of detail of the map information being displayed in the map information display region 21 in response to the mochi-drag operation.

Specifically, the CPU 11 scrolls the map information according to the direction of the touch position TP relative to the screen center MP and the movement speed of the touch position TP. Simultaneously, the CPU 11 changes the level of detail of the map information according to the distance from the screen center MP to the touch position TP and the movement speed of the touch position TP.

In this regard, the greater the CPU 11 is adapted to lower the level of detail of the map information, the larger the distance from the screen center MP to the touch position TP and the higher the movement speed of the touch position TP. The fact that the movement distance of the user's finger is large or the movement speed is higher means that a destination desired by the user is far, and, in this case, it is conceivable that a perspective view is requested. Therefore, the greater the CPU 11 lowers the level of detail of the map information, the larger the movement distance and the higher the movement speed of the user's finger, and the user may be allowed to perform intuitive operation.

Here, it is assumed that the user releases the finger from the touch panel 3B after the user performs the mochi-drag operation in the above described manner. When the CPU 11 recognizes that the user's finger has been released from the touch panel 3B, the CPU recognizes that the mochi-drag operation has been ended, and fixes and displays the level of detail and the display location of the map information being displayed on the map screen 20. Further, the CPU 11 shrinks and returns the shape of the mochi-cursor MC to the circular shape and displays it.

Figure 4B:
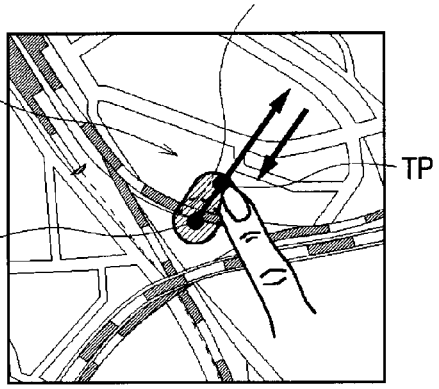

Further, here, it is assumed that, after the user performs the mochi-drag operation in the above described manner, subsequently performs an operation to return the finger into the mochi-cursor display region MR with the finger remaining touching as shown in FIG. 4B.

When the mochi-drag operation is started, the CPU 11 recognizes that the mochi-drag operation is maintained while the user's finger touches the touch panel 3B. Then, as the touch position TP approaches to return to the screen center MP, the CPU 11 is adapted to scroll the map information while raising the level of detail of the map information according to the distance from the screen center MP to the touch position TP.

Figure 4C:
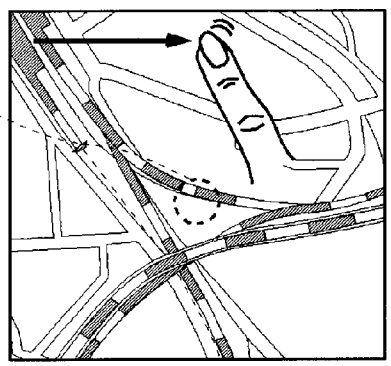

However, it is assumed that a drag operation starting from a position outside of the mochi-cursor display region MR (hereinafter, also referred to as "normal drag operation") is performed as shown in FIG. 4C. Here, the CPU 11 recognizes that only scrolling of the map information has been instructed, and performs only scrolling of the map information in response to the normal drag operation without changing the level of detail of the map information.

Further, when the CPU 11 recognizes that the normal drag operation has been started, the CPU makes the mochi-cursor MC disappear from the map screen 20 during the normal drag operation so that the mochi-cursor MC may not be operated, but the user may see the entire map screen 20.

Figure 4D:
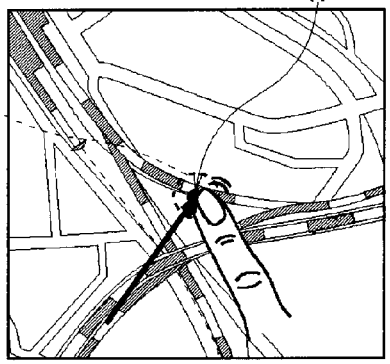

Therefore, for example, as shown in FIG. 4D, even when the touch position TP is moved to the mochi-cursor display region MR at the normal drag operation, the CPU 11 is adapted to remain continuing scrolling only.

Figure 4E:
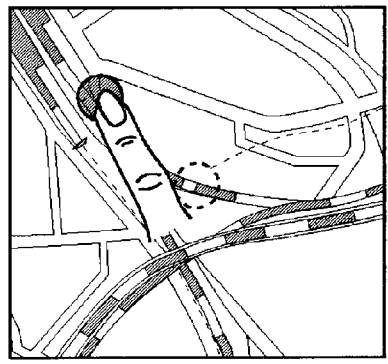

Further, as shown in FIG. 4E, it is assumed that an operation in which the position outside of the mochi-cursor display region MR is touched and pressed down in a predetermined time (hereinafter, also referred to as "press and hold operation") is performed. In this regard, the CPU 11 recognizes that only raising of the level of detail of the map information has been instructed, and raises the level of detail of the map information in response to the press and hold operation without scrolling of the map information.

Figure 4F:
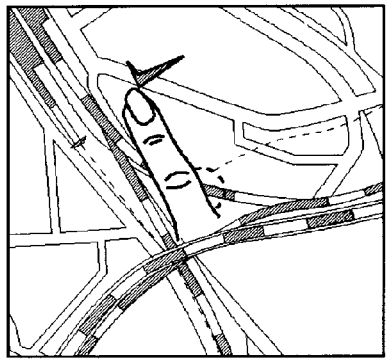

On the other hand, as shown in FIG. 4F, it is assumed that an operation in which the position outside of the mochi-cursor display region MR is touched and immediately released (hereinafter, also referred to as "tap operation") is performed. In this regard, the CPU 11 recognizes that only lowering of the level of detail of the map information has been instructed, and lowers the level of detail of the map information in response to the tap operation without scrolling of the map information.

Further, when the CPU 11 recognizes that the press and hold operation or the tap operation has been started, the CPU makes the mochi-cursor MC disappear from the map screen 20 during the operation so that the mochi-cursor MC may not be operated, but the user may see the entire map screen 20.

Figure 5:
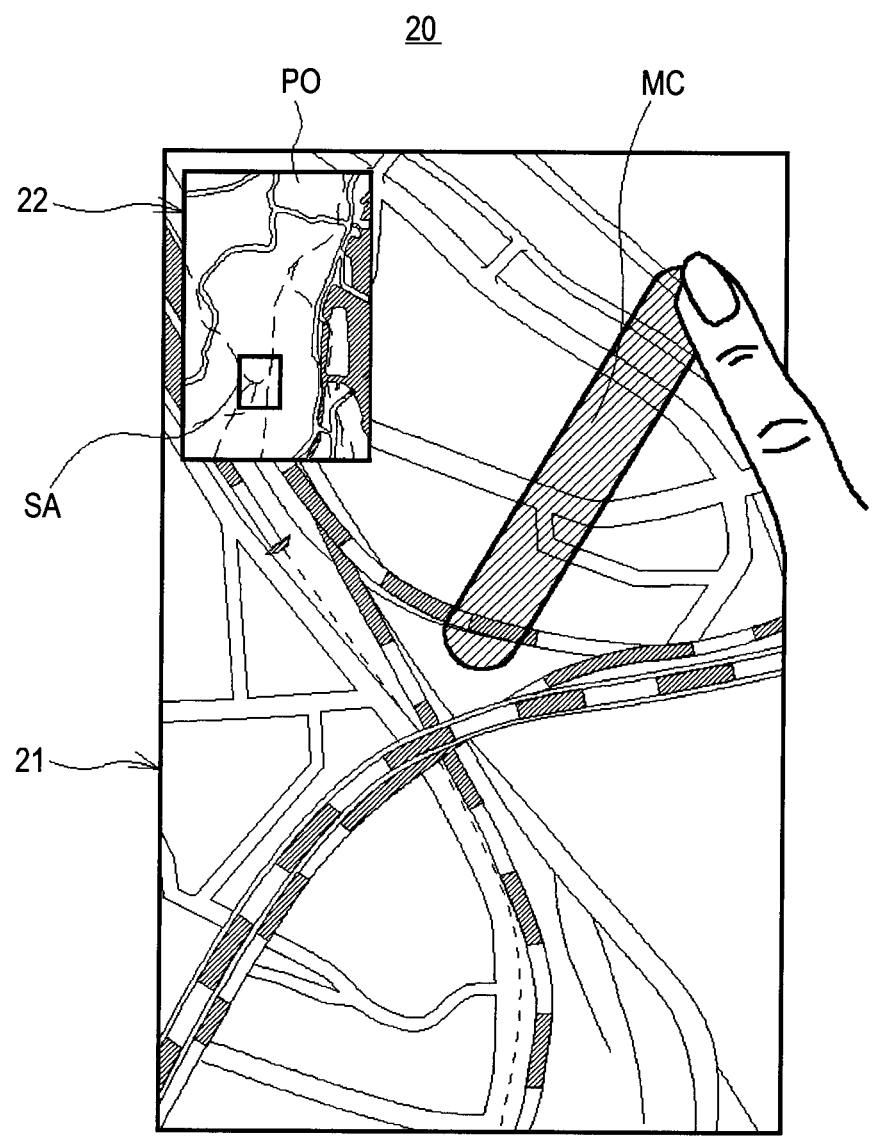
FIG. 5 is a schematic diagram showing a configuration of a map screen (2) in the first embodiment of the invention.

When the CPU 11 performs changing of the level of detail and scrolling of the map information in response to user operation, an overview display region 22 for displaying the range of the area of the map information displayed on the map information display region 21 is provided on the upper left of the map screen 20 as shown in FIG. 5. Then, the CPU 11 displays a map image PO for overview with reduced scale and display a display range frame SA indicating the display range of the map information in the overview display region 22.

The CPU 11 performs changing of the level of detail and scrolling of the map information in response to user operation, and, if the display range of the map information displayed on the map information display region 21 changes, moves the display range frame SA and changes the size thereof according to the change. Then, when the changing of the level of detail of the map information or the scrolling of the map information is ended, the CPU 11 makes the display of the overview display region 22 disappear after a predetermined time (e.g., after three seconds).

In this manner, the CPU 11 is adapted to inform the user of the display range of the map information displayed in the map information display region 21. Thereby, the information processing device 1 can make the user easier to find desired map information.

1-3. Map Information Changing Operation Processing Procedure

Figure 6:
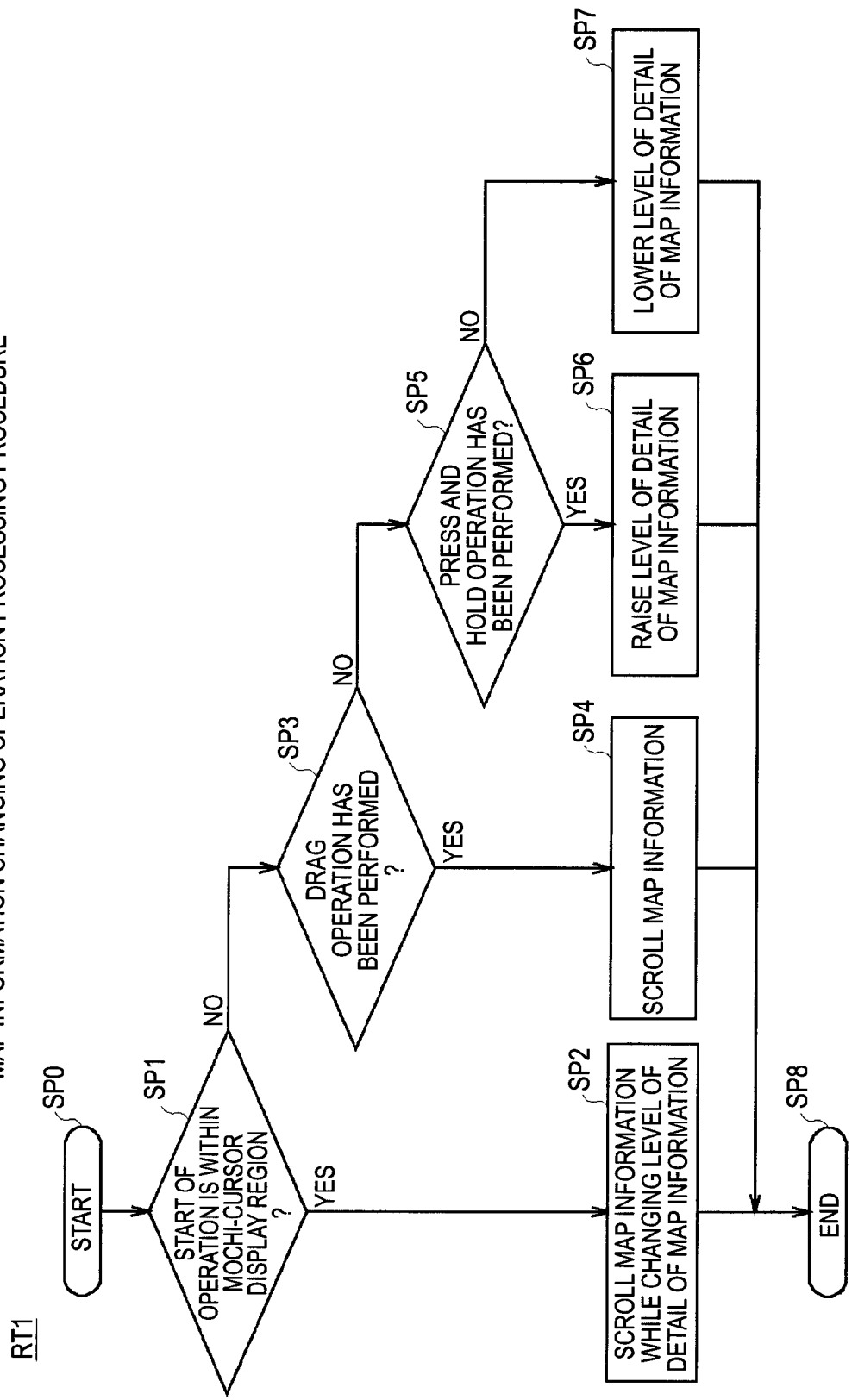
FIG. 6 is a flowchart showing a map information changing processing procedure in the first embodiment of the invention.

Next, an operation processing procedure RT1 in the above described map information changing operation in the information processing device 1 (also referred to as "map information changing operation processing procedure") will be explained in detail using a flowchart shown in FIG. 6. The map information changing operation processing procedure RT1 is executed by the CPU 11 according to a program installed in the nonvolatile memory 12.

When recognizing that the user's finger has touched the touch panel 3B and the user operation has started, the CPU 11 starts the map information changing operation processing procedure RT1 from step SP0 and moves to the next step SP1.

At step SP1, the CPU 11 determines whether the start of the user operation is within the mochi-cursor display region MR or not. Specifically, when the CPU 11 determines that the touch position TP of at the start of the user operation is within the mochi-cursor display region MR, the CPU determines that the start of the user operation is within the mochi-cursor display region MR.

If a positive result is obtained at step SP1, this means that the mochi-drag operation has been started by the user, and the CPU 11 moves to step SP2.

At step SP2, the CPU11 scrolls the map information while changing the level of detail of the map information being displayed on the map screen 20 in response to the mochi-drag operation, moves to step SP8, and ends the map information changing operation processing procedure RT1.

On the other hand, a negative result is obtained at step SP1 because the start of the user operation is outside of the mochi-cursor display region MR, the CPU 11 moves to step SP3.

At step SP3, the CPU 11 determines whether the drag operation has been performed by the user of not. Specifically, when the CPU 11 determines that the touch position TP has moved a predetermined distance or more, the CPU determines that the drag operation has been performed.

If a positive result is obtained at step SP3, this means that the normal drag operation has been performed by the user, and the CPU 11 moves to step SP4.

At step SP4, the CPU 11 performs only scrolling of the map information being displayed on the map screen 20, moves to step SP8, and ends the map information changing operation processing procedure RT1.

On the other hand, if a negative result is obtained at step SP3 because the drag operation has not been performed by the user, the CPU 11 moves to step SP5.

At step SP5, the CPU 11 determines whether the press and hold operation has been performed or not. Specifically, when the CPU 11 determines that the time in which the finger touches the touch panel 3B is a predetermined time or more, the CPU determines that the press and hold operation has been performed.

If a positive result is obtained at step SP5, this means that the press and hold operation for the part outside of the mochi-cursor display region MR has been performed by the user, and the CPU 11 moves to step SP6.

At step SP6, the CPU 11 raises the level of detail of the map information being displayed on the map screen 20, moves to step SP8, and ends the map information changing operation processing procedure RT1.

On the other hand, if a negative result is obtained at step SP5, this means that the tap operation for the part outside of the mochi-cursor display region MR has been performed by the user, and the CPU 11 moves to step SP7.

At step SP7, the CPU 11 lowers the level of detail of the map information being displayed on the map screen 20, moves to step SP8, and ends the map information changing operation processing procedure RT1.

According to the map information changing operation processing procedure RT1, the CPU 11 is adapted to recognize the user operation, and performing changing of the level of detail and the scrolling of the map information being displayed on the map screen 20 in response to the operation.

1-4. Operation and Effect in the First Embodiment

In the above described configuration, when the information processing device 1 recognizes the user operation via the touch panel 3B, the device determines whether the user operation is an operation starting from within the mochi-cursor display region MR or not.

Then, if the information processing device 1 determines that the user operation is the operation starting from a position within the mochi-cursor display region MR, the device performs scrolling of the map information while changing the level of detail of the map information in response to the user operation.

On the other hand, if the information processing device 1 determines that the user operation is the operation starting from a position outside of the mochi-cursor display region MR, the device performs only scrolling of the map information in response to the user operation.

Further, if the information processing device 1 determines that the user operation is the press and hold or the tap operation for a position outside of the mochi-cursor display region MR, the device performs only changing of the level of detail of the map information in response to the user operation.

Thereby, the information processing device 1 can selectively perform the changing of the level of detail of the map information and the scrolling of the map information at the same time or separately by allowing the user to perform a simple operation of changing the start of the operation.

Further, the information processing device 1 displays the mochi-cursor MC indicating the mochi-cursor display region MR on the map screen 20. Thereby, the information processing device 1 can allow the user to recognize the position and the range of the mochi-cursor display region MR, and allow the user to easily and distinctively perform the operation starting from within the mochi-cursor display region MR and the operation starting from outside of the mochi-cursor display region MR.

Further, when an instruction to change the level of detail of the map information is provided by the user operation, the information processing device 1 changes the scale of the map information and, if the scale of the map information takes a predetermined value, switches to an image at the higher level of detail or at the lower level of detail than at present as the map information.

Thereby, the information processing device 1 can provide images at various levels of detail automatically according to the scale of the map information only by allowing the user to perform the operation for changing the level of detail of the map information without allowing the user to separately perform the operation for switching to an image at a different level of detail.

Further, in the information processing device 1, the mochi-cursor display region MR provided on the map screen 20 is provided at the center of the display screen. Thereby, when allowing the user to perform the drag operation starting from the mochi-cursor display region MR, the information processing device 1 can take the movement range of the touch position TP wider and take the range of the drag operation wider.

Furthermore, in the information processing device 1, the mochi-cursor MC displayed on the map screen 20 is semi-transparent. Thereby, the information processing device 1 can prevent the map information under the mochi-cursor MC from being hidden.

According to the above described configuration, when the information processing device 1 determines that the user operation is the operation starting from within the mochi-cursor display region MR, the device scrolls the map information while changing the level of detail of the map information in response to the user operation. On the other hand, when the information processing device 1 determines that the user operation is the operation starting from outside of the mochi-cursor display region MR, the device performs changing of the level of detail of the map information or scrolling of the map information in response to the user operation.

Thereby, the information processing device 1 can selectively perform the changing of the level of detail of the map information and the scrolling of the map information at the same time or separately by allowing the user to perform a simple operation of changing the start of the operation, and can further improve the operability.

1-5. Functional Configuration in the First Embodiment

Figure 7:
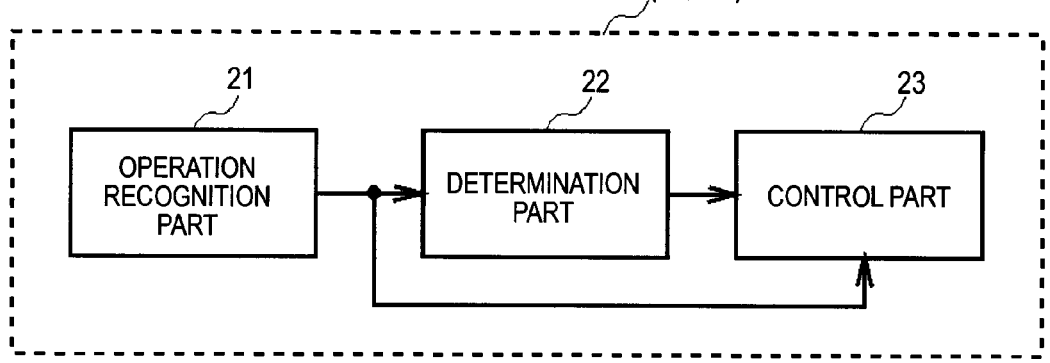
FIG. 7 is a block diagram showing a functional configuration of the information processing device in the first to third embodiments of the invention.

Here, a functional configuration of the information processing device 1 in which an emphasis is on the above described map information changing operation will be explained. As shown in FIG. 7, the information processing device 1 functions as an operation recognition part 21, a determination part 22, and a control part 23.

In the information processing device 1, the above described touch panel 3B and CPU 11 function as the operation recognition part 21. The operation recognition part 21 recognizes the user operation for the display screen of the display unit.

Further, in the information processing device 1, the above described CPU 11 functions as the determination part 22. The determination part 22 determines whether the user operation recognized by the operation recognition part 21 is an operation starting from within a predetermined region of the display screen (in this embodiment, within the mochi-cursor display region MR) or not.

Furthermore, in the information processing device 1, the above described CPU 11 functions as the control part 23. If the determination that the user operation is the operation starting from within the predetermined region is made by the determination part 22, the control part 23 scrolls the information while changing the level of detail of the map information of the information being displayed on the display screen (in this case, the map information) in response to the user operation. On the other hand, if the determination that the user operation is not the operation starting from the position within predetermined region is made by the determination part 22, the control part 23 performs the scrolling of the information or the changing of the level of detail of the information in response to the user operation.

According to the functional configuration, the information processing device 1 is adapted to be able to functionally realize the above described map information changing operation.

2. Second Embodiment

Next, the second embodiment will be explained. The second embodiment is different from the above described first embodiment in that the mochi-cursor MC is displayed on the map screen 20 only when the user is about to operate the touch panel 3B.

In practice, if the mochi-cursor MC is constantly displayed on the map screen 20, the map information in the range overlapping with the mochi-cursor MC becomes hard to be seen. Therefore, the mochi-cursor MC is displayed only when the user is about to operate the touch panel 3B according to the second embodiment, and thereby, the map information can be viewed without the difficulty in view of the map information due to the mochi-cursor MC.

In an information processing device 50 (FIGS. 1A and 1B) in the second embodiment, a display unit 53 is provided in place of the display unit 3 of the information processing device 1 in the above described first embodiment. The display unit 53 includes an LCD 53A and a photosensor-type touch panel 53B.

Further, since the map information changing operation in the second embodiment is the same as that of the first embodiment, the explanation will be omitted. Therefore, here, the operation processing procedure for displaying the mochi-cursor MC on the map screen 20 (also referred to as "mochi-cursor display processing procedure") will be mainly explained.

2-1. Mochi-Cursor Display Processing Procedure

Figure 8:
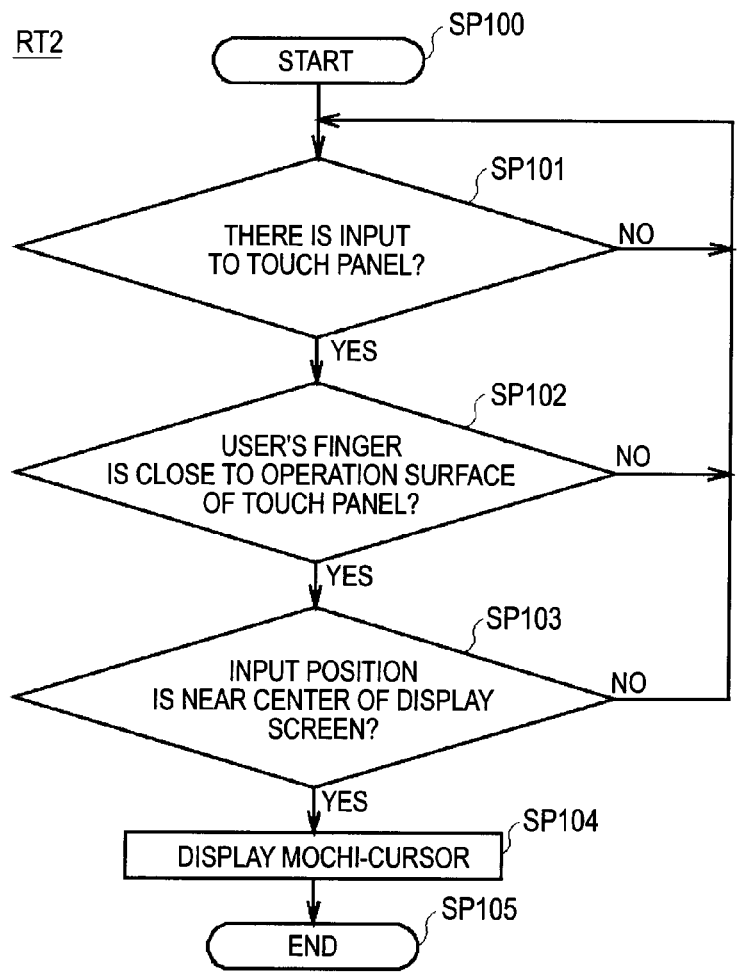
FIG. 8 is a flowchart showing a mochi-cursor display processing procedure in the second embodiment of the invention.

A mochi-cursor display processing procedure RT2 will be specifically explained using a flowchart shown in FIG. 8. The mochi-cursor display processing procedure RT2 is executed by the CPU 11 of the information processing device 50 according to a program installed in the nonvolatile memory 12.

When the map screen 20 is displayed on the LCD 53A, for example, the CPU 11 starts the mochi-cursor display processing procedure RT2 from step SP100 and moves to the next step SP101.

At step SP101, the CPU 11 determines whether there is input to the touch panel 53B or not.

Specifically, the touch panel 53B has plural photosensors arranged in a matrix. These photosensors receive light entering the touch panel 53B from the outside at predetermined intervals, and detect the light intensity.

When the user is about to operate the touch panel 53B, a shadow of the user's finger appears on the operation surface of the touch panel 53B, and the light intensity detected by the touch panel 53B becomes lower. In consideration of that, if the light intensity detected by the photosensors changes, the touch panel 53B determines that there is an input to the touch panel 53B. Then, the touch panel 53B sends out the amount of change of the light intensity and the input positions to the CPU 11 with the positions of the photosensors on the operation surface of the touch panel 53B as input positions.

Then, when the amount of change of the light intensity and the input positions are sent out from the touch panel 53B, the CPU 11 is adapted to determine that there is an input to the touch panel 53B.

At step SP101, if a negative result is obtained because there is no input to the touch panel 53B, the CPU 11 returns to step SP101 and waits until there is an input to the touch panel 53B.

On the other hand, at step SP101, if a positive result is obtained because there is an input to the touch panel 53B, the CPU 11 moves to step SP102.

At step SP102, the CPU 11 determines whether the user's finger is close to the operation surface of the touch panel 53B or not. Specifically, the closer to the operation surface of the touch panel 53B the user's finger, the darker the shadow of the user's finger appearing on the operation surface and the lower the light intensity detected by the touch panel 53B. In consideration of that, when the amount of change of the light intensity sent out from the touch panel 53B is equal to or more than a predetermined value, the CPU 11 determines that the user's finger is close to the operation surface of the touch panel 53B.

If a negative result is obtained at step SP102, this means that the user is not about to operate the touch panel 53B. Here, the CPU 11 returns to step SP101, and waits until there is an input to the touch panel 53B.

On the other hand, if a positive result is obtained at step SP102, this means that the user is about to operate the touch panel 53B. Here, the CPU 11 moves to step SP103.

At step SP103, the CPU 11 determines whether the input positions are near the center of the display screen or not. Specifically, the CPU 11 detects the input positions as coordinates within the display screen displayed on the LCD 3A based on the input positions sent out from the touch panel 53B. Then, the CPU 11 determines whether the detected coordinates are within a predetermined region around the center of the display screen (e.g., about several times the mochi-cursor display region MR) or not. Then, when the CPU 11 determines that the detected coordinates are within the predetermined region, the CPU determines that the input positions are near the center of the display screen.

If a negative result is obtained at step SP103, this means that the user is not about to operate the mochi-cursor MC because the user's finger is far from the mochi-cursor display region MR. Here, the CPU 11 returns to step SP101, and waits until there is an input to the touch panel 53B.

On the other hand, if a positive result is obtained at step SP103, this means that the user is about to operate the mochi-cursor MC because the user's finger is near the mochi-cursor display region MR. Here, the CPU 11 moves to step SP104.

At step S104, the CPU 11 displays the mochi-cursor MC in the mochi-cursor display region MR of the map screen 20, moves to step S105, and ends the mochi-cursor display processing procedure RT2.

According to the mochi-cursor display processing procedure RT2, the CPU 11 is adapted to display the mochi-cursor MC.

In this manner, the information processing device 50 of the second embodiment displays the mochi-cursor MC on the map screen 20 when the determination that the user's finger is close to the operation surface of the touch panel 53B is made, and does not display the mochi-cursor MC in other cases.

Thereby, the information processing device 50 can allow the user to view the map information without the difficulty in view due to the mochi-cursor MC in the other cases than the case where the user is about to operate the mochi-cursor MC.

2-2. Functional Configuration in the Second Embodiment

Here, a functional configuration of the information processing device 50 in which an emphasis is on the above described processing of displaying the mochi-cursor MC will be explained. As is the case of the information processing device 1 (FIG. 7), the information processing device 50 functions as an operation recognition part 21, a determination part 22, and a control part 23.

In the information processing device 50, the above described touch panel 53B and CPU 11 function as the operation recognition part 21. The operation recognition part 21 detects the approach and the contact of an indicator (in this embodiment, the user's finger) on the operation surface corresponding to the display screen of the display unit (in this embodiment, the operation surface of the touch panel 53B) and recognizes the user operation based on the detection result.

Further, in the information processing device 50, the above described CPU 11 functions as the control part 23. If the approach of the indicator is detected by the operation recognition part 21, the control part 23 displays a frame indicating the predetermined region (in this embodiment, the mochi-cursor MC) on the display screen.

According to the functional configuration, the information processing device 50 is adapted to be able to functionally realize the above described processing of displaying the mochi-cursor MC.

3. Third Embodiment

Next, the third embodiment will be explained. The third embodiment is different from the above described first embodiment in that a music selection screen 30 (FIG. 12) for selecting pieces of music desired to be reproduced by the user is displayed.

Figure 9A:
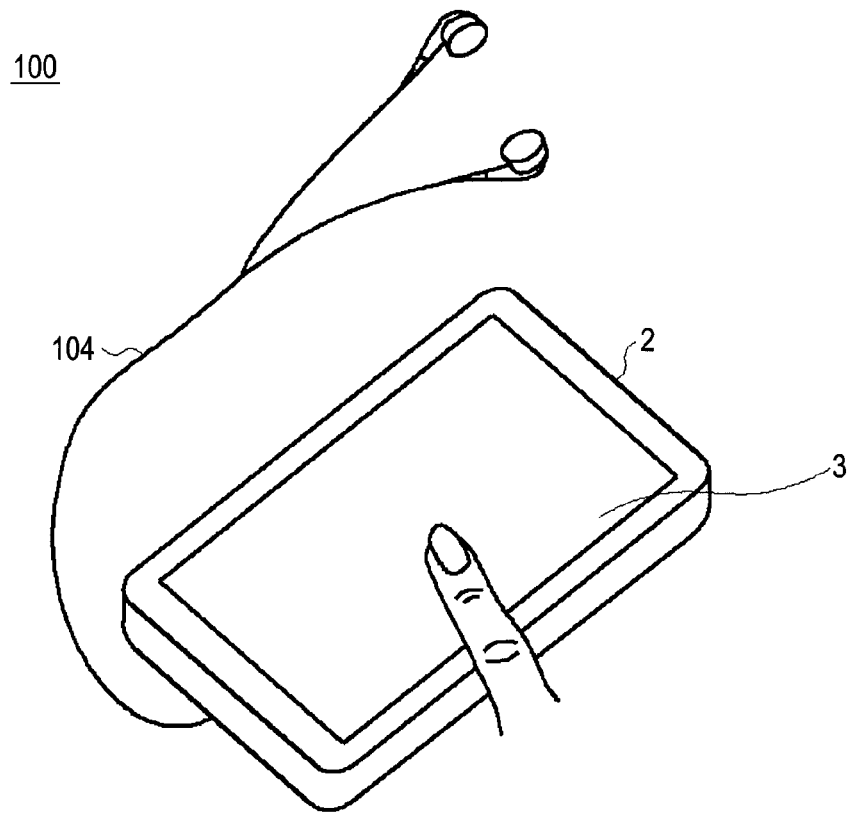
FIGS. 9A and 9B are schematic diagram showing a configuration of an information processing device in the third embodiment of the invention.
Figure 9B:
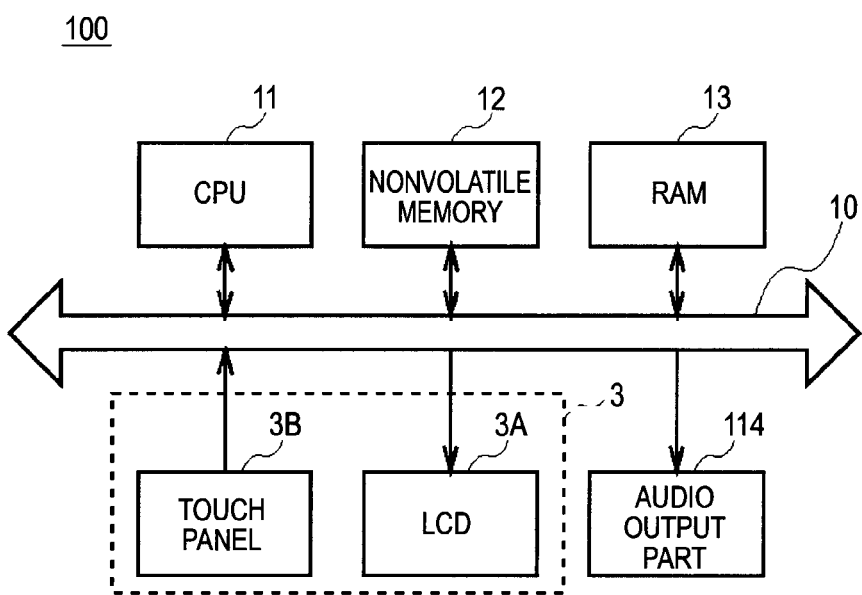

In an information processing device 100 in the third embodiment, as shown in FIGS. 9A and 9B in which the same signs are assigned to the parts corresponding to those in FIGS. 1A and 1B, a headphone 104 and an audio output part 114 are provided in addition to the configuration of the information processing device 1 in the above described first embodiment.

When an instruction to reproduce the music by the user operation, the CPU 11 reads out audio data of the music from the nonvolatile memory 12. Then, the CPU 11 obtains audio signals by performing predetermined reproduction processing such as decoding processing and amplification processing on the audio data, and sends out the audio signals to the audio output part 114. As a result, audio of the music based on the audio signals is output from the audio output part 114 via the headphone 104.

3-1. Music-Related Information Changing Operation

Figure 10:
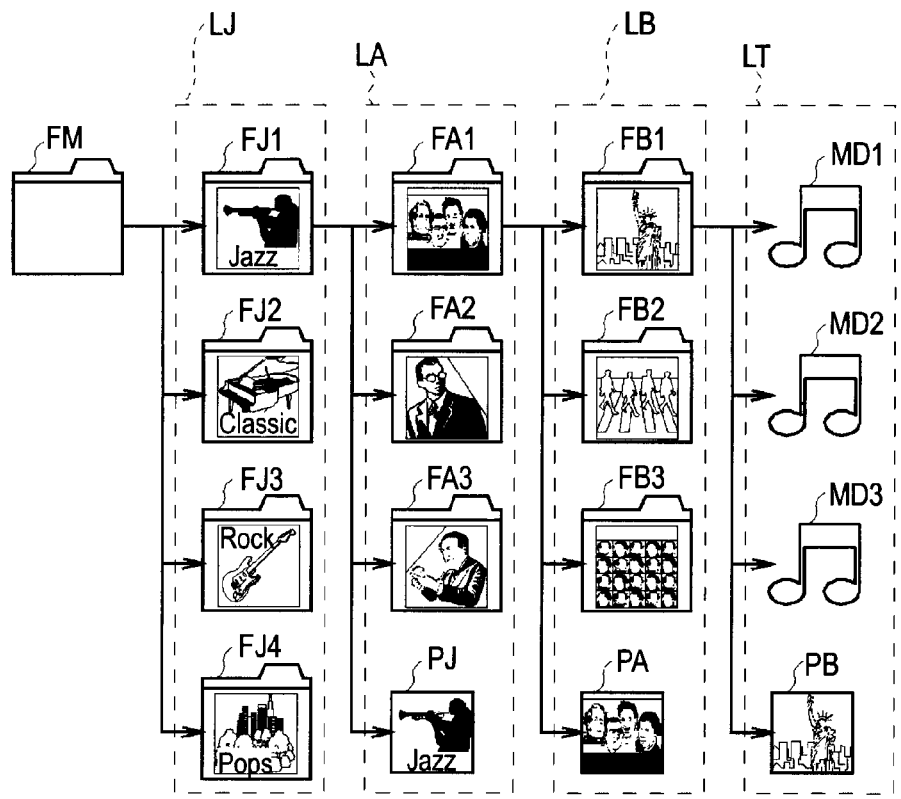
FIG. 10 is a schematic diagram for explanation of a folder structure of music-related information in the third embodiment of the invention.

Next, a music-related information changing operation in the information processing device 100 will be explained in detail. Here, in the information processing device 100, as shown in FIG. 10, plural pieces of music data MD (MD1, MD2, . . . , MDn) are recorded in the nonvolatile memory 12. Here, the music data MD contains not only the audio data of music but also data of music-related information as information related to the music (title, name of artist, name of album, category, and so on).

The respective pieces of music data MD are sorted and stored in folders with respect to albums (also referred to as "album folders") FB (FB1, FB2, . . . FBn) based on the music-related information. Further, the album folders FB are sorted and stored in folders with respect to artists (also referred to as "artist folders") FA (FA1, FA2, . . . , FAn) based on the music-related information. Furthermore, the artist folders FA are sorted and stored in folders with respect to categories (e.g., rock, classical, etc.) (also referred to as "category folders") FJ (FJ1, FJ2, . . . , FJn) based on the music-related information. Further, the category folders FJ are stored in a music folder FM.

In the album folders FB, jacket photo images PB of albums corresponding to the album folders FB are respectively stored. Further, in the artist folders FA, images of artists (also referred to as artist images) PA corresponding to the artist folders FA are respectively stored. Furthermore, in the category folders FJ, icon images showing categories (also referred to as category images) PJ corresponding to the category folders FJ are respectively stored. The jacket photo images PB, the artist images PA, and the category images PJ are music-related information.

Here, the layer in which the category folders FJ are stored is also called a category layer LJ, the layer in which the artist folders FA are stored is also called an artist layer LA. Further, the layer in which the album folders FB are stored is also called an album layer LB, and the layer in which the music data is stored is called a music layer LT.

When an instruction is provided to launch an application of reproducing music by the user operation, the CPU 11 reads out the music-related information of plural pieces of music recorded in the nonvolatile memory 12. Then, the CPU 11 allows the LCD 3A to display the music selection screen 30 (FIG. 12) for selection of music based on the music-related information. The music selection screen 30 will be described later in detail.

The CPU 11 is adapted to change the level of detail of the music-related information displayed on the music selection screen 30 and scroll the music-related information in response to the user operation for the touch panel 3B.

Figure 11:
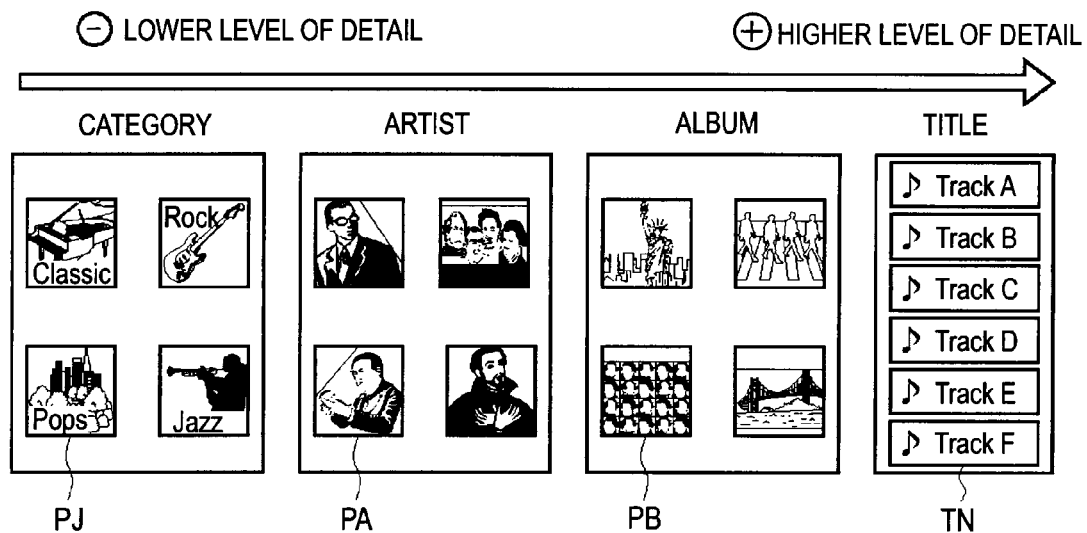
FIG. 11 is a schematic diagram for explanation of changing of the level of detail of music-related information in the third embodiment of the invention.

Here, the changing of the level of detail of the music-related information displayed on the music selection screen 30 will be explained using FIG. 11. The CPU 11 reads out the category images PJ respectively from the plural category folders FJ stored in the music folders FM, for example. Then, the CPU 11 arranges and displays the category images PJ in a matrix on the music selection screen 30. That is, the CPU 11 displays the music-related information of the category layer LJ on the music selection screen 30.

In this regard, when an instruction to further raise the level of detail of the music-related information is provided by the user operation, the CPU 11 reads out the artist images PA from the artist folders FA stored in an arbitrary category folder FJ. Then, the CPU 11 arranges and displays the artist images PA in a matrix on the music selection screen 30.

In this manner, the CPU 11 switches the layer of the music-related information being displayed on the music selection screen 30 from the category layer LJ to the artist layer LA.

Further, in this regard, when an instruction to further raise the level of detail of the music-related information is provided by the user operation, the CPU 11 reads out the jacket photo images PB from the album folders FB stored in an arbitrary artist folder FA. Then, the CPU 11 arranges and displays the jacket photo images PB in a matrix on the music selection screen 30.

In this manner, the CPU 11 switches the layer of the music-related information being displayed on the music selection screen 30 from the artist layer LA to the album layer LB.

Furthermore, in this regard, when an instruction to raise the level of detail of the music-related information is provided by the user operation, the CPU 11 reads out the respective titles TN from the music data MD stored in an arbitrary album folder FB, and displays a list of them above and below the music selection screen 30.

In this manner, the CPU 11 switches the layer of the music-related information being displayed on the music selection screen 30 from the album layer LB to the music layer LT.

As described above, when an instruction to raise the level of detail of the music-related information is provided by the user operation on the music selection screen 30, the CPU 11 is adapted to switch the layer of the music-related information to the lower layer than at present.

On the other hand, when an instruction to lower the level of detail of the music-related information is provided by the user operation on the music selection screen 30, the CPU 11 is adapted to switch the layer of the music-related information to the upper layer than at present.

Next, user operations corresponding to the changing of the level of detail and the scrolling of the music-related information on the music selection screen 30 will be specifically explained.

Figure 12:
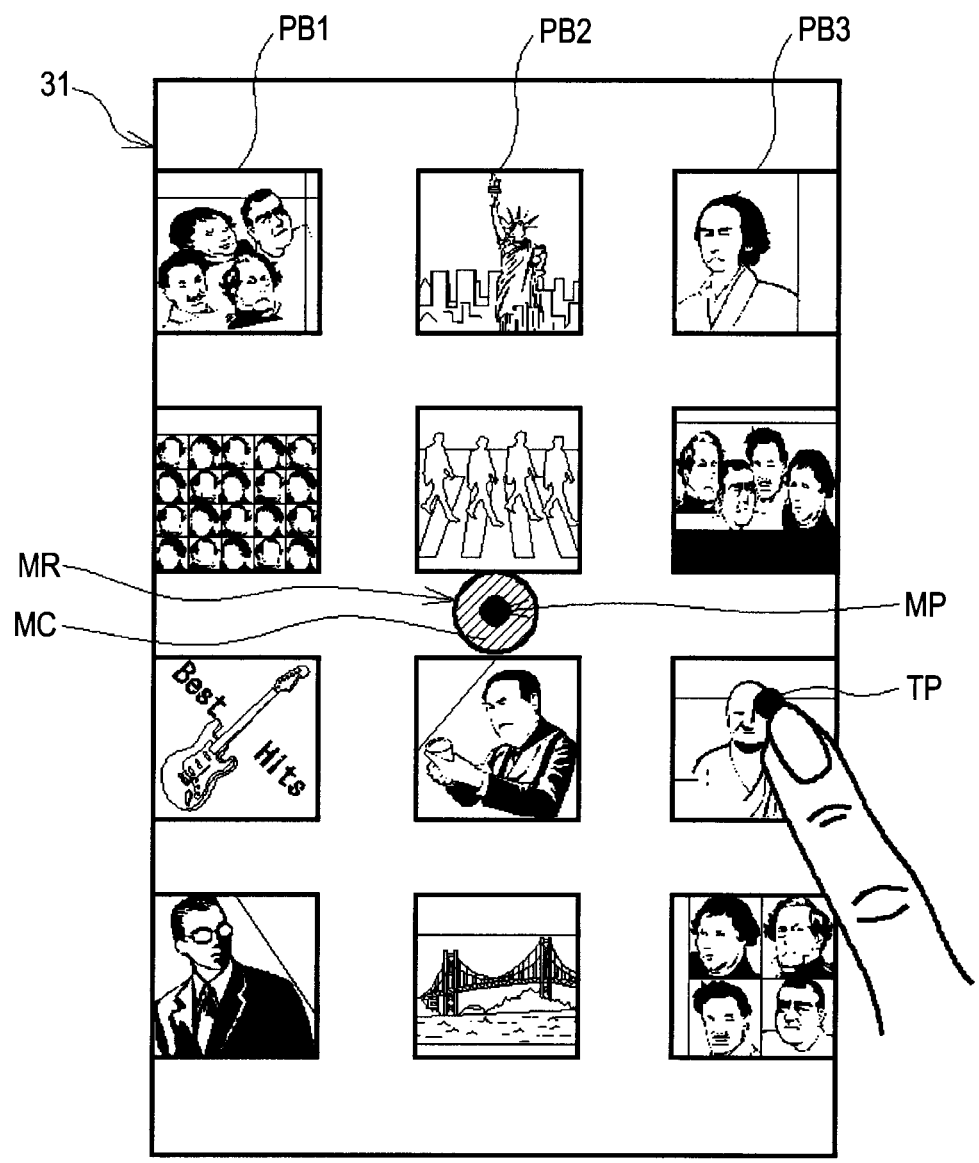
FIG. 12 is a schematic diagram showing a configuration of a music selection screen in the third embodiment of the invention.

When an instruction is provided to launch an application of reproducing music by the user operation, the CPU 11 allows the LCD 3A to display the music selection screen 30 as shown in FIG. 12.

Specifically, the music selection screen 30 includes a music-related information display region 31 for displaying music-related information and a mochi-cursor display region MR for displaying a mochi-cursor MC.

For example, the CPU 11 arranges and displays the jacket photo images PB (PB1, PB2, . . . , PBn) read out from the plural album folders FB in the music-related information display region 31. That is, the CPU 11 displays the music-related information of the album layer LB on the music selection screen 30.

Here, it is assumed that a drag operation starting from a position outside of the mochi-cursor display region MR, i.e., the normal drag operation is performed by the user. In this regard, the CPU 11 recognizes that scrolling of the music-related information has been instructed, and scrolls the music-related information (here, jacket photo images PB) on the music selection screen 30 in response to the normal drag operation.

Further, it is assumed that the press and hold operation is performed on the jacket photo image PB in a position outside of the mochi-cursor display region MR by the user. In this regard, the CPU 11 recognizes that raising of the level of detail of the music-related information has been instructed, and switches the music-related information to the lower layer than the present layer in response to the press and hold operation.

Here, the CPU 11 switches the music-related information from the album layer LB to the music layer LT, and displays a list of the titles TN of the pieces of music within the album corresponding to the jacket photo image PB in the music-related information display region 31.

On the other hand, it is assumed that the tap operation is performed in a position outside of the mochi-cursor display region MR by the user. In this regard, the CPU 11 recognizes that lowering of the level of detail of the music-related information has been instructed, and switches the music-related information to the upper layer than the present layer in response to the tap operation.

Here, the CPU 11 switches the music-related information from the album layer LB to the artist layer LA, reads out the artist images PA from the plural artist folders FA, and arranges and displays them in a matrix in the music-related information display region 31.

Further, it is assumed that a drag operation starting from a position within the mochi-cursor display region MR, i.e., the mochi-drag operation is performed by the user. In this regard, the CPU 11 recognizes that scrolling of the music-related information while changing of the level of detail of the music-related information has been instructed, and switches the layer of the music-related information to the upper or lower layer than at present and scrolls the music-related information in response to the mochi-drag operation.

Specifically, the CPU 11 further lowers the level of detail of the music-related information as the user moves the finger farther away from the mochi-cursor display region MR in the mochi-drag operation, that is, the distance from the screen center MP to the touch position TP is larger. That is, the CPU 11 switches the layer of the music-related information in the order of the music layer LT, the album layer LB, the artist layer LA, and the category layer LJ as the distance from the screen center MP to the touch position TP is larger in the mochi-drag operation. Concurrently, the CPU 11 scrolls the music-related information being displayed according to the direction of the touch position TP relative to the screen center MP and the movement speed of the touch position TP.

On the other hand, the CPU 11 further raises the level of detail of the music-related information as the user moves the finger closer to the mochi-cursor display region MR in the mochi-drag operation, that is, the distance from the screen center MP to the touch position TP is smaller. That is, the CPU 11 switches the layer of the music-related information in the order of the category layer LJ, the artist layer LA, the album layer LB, and the music layer LT as the distance from the screen center MP to the touch position TP is smaller in the mochi-drag operation. Concurrently, the CPU 11 scrolls the music-related information being displayed according to the direction of the touch position TP relative to the screen center MP and the movement speed of the touch position TP.

Here, it is assumed that, in the mochi-drag operation by the user, the touch position TP moves apart from the screen center MP and then moves closer to the screen center MP again, and the music-related information of the music layer LT is displayed on the music selection screen 30, and then, in the mochi-drag operation, the touch position TP moves further closer to the screen center MP and enters the mochi-cursor display region MR.

In this regard, the CPU 11 recognizes that the piece of music corresponding to the title TN being displayed at the center of the music selection screen 30 has been selected, and reproduces the music. As a result, audio of the music is output via the audio output part 114 and the headphone 104.

As described above, the CPU 11 is adapted to allow the user to perform an operation of raising the level of detail of the music-related information in the mochi-drag operation, and finally regard and perform reproduction of the music as the status of the highest level of detail. Thereby, the information processing device 1 can allow the user not only to change the level of detail of the music-related information select but also to reproduce the music only by the mochi-drag operation.

3-2. Music-Related Information Changing Operation Processing Procedure

Figure 13:
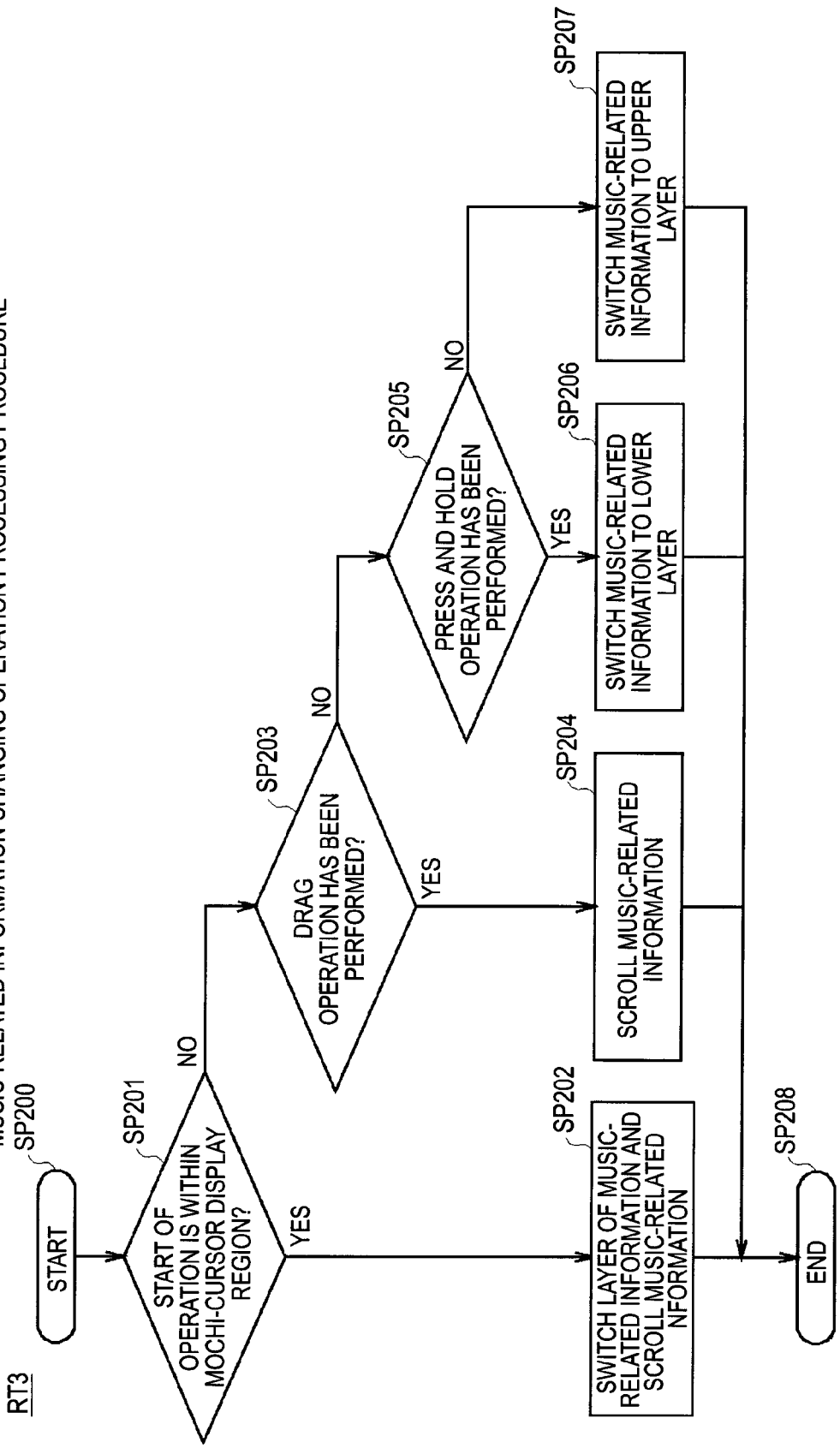
FIG. 13 is a flowchart showing a music-related information changing operation processing procedure in the third embodiment of the invention.
Figure 14:
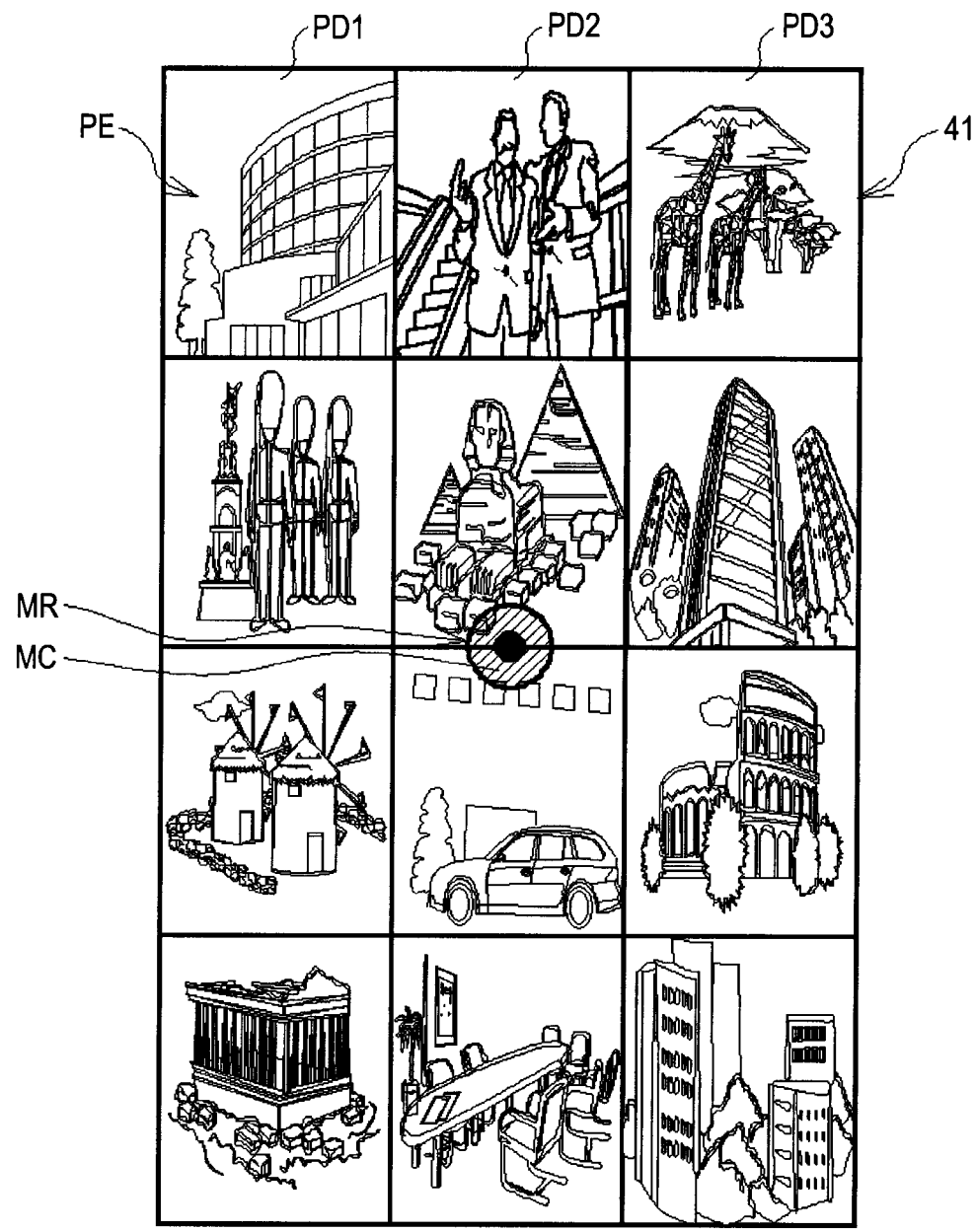
FIG. 14 is a schematic diagram showing a configuration of an image view screen in other embodiments of the invention.

Next, an operation processing procedure RT3 in the above described music-related information changing operation in the information processing device 100 (also referred to as "music-related information changing operation processing procedure") will be explained in detail using a flowchart shown in FIG. 13. The music-related information changing operation processing procedure RT3 is executed by the CPU 11 according to a program installed in the nonvolatile memory 12.

When recognizing that the user's finger has touched the touch panel 3B and the user operation has started on the music selection screen 30, the CPU 11 starts the music-related information changing operation processing procedure RT3 from step SP200 and moves to the next step SP201.

At step SP201, the CPU 11 determines whether the start of the user operation is within the mochi-cursor display region MR or not. If a positive result is obtained at step SP201, this means that the mochi-drag operation has been started by the user, and the CPU 11 moves to step SP202.

At step SP202, the CPU11 switches the music-related information being displayed on the music selection screen 30 to the upper or the lower layer than at present and scrolls the music-related information, moves to step SP208, and ends the music-related information changing operation processing procedure RT3.

On the other hand, if a negative result is obtained at step SP201 because the start of the user operation is outside of the mochi-cursor display region MR, the CPU 11 moves to step SP203.

At step SP203, the CPU 11 determines whether the drag operation has been performed by the user of not. If a positive result is obtained at step SP203, this means that the normal drag operation has been performed by the user, and the CPU 11 moves to step SP204.

At step SP204, the CPU 11 performs only scrolling of the music-related information being displayed on the music selection screen 30, moves to step SP208, and ends the music-related information changing operation processing procedure RT3.

On the other hand, if a negative result is obtained at step SP203 because the drag operation has not been performed by the user, the CPU 11 moves to step SP205.

At step SP205, the CPU 11 determines whether the press and hold operation has been performed or not. If a positive result is obtained at step SP205, this means that the press and hold operation for the part outside of the mochi-cursor display region MR has been performed by the user, and the CPU 11 moves to step SP206.

At step SP206, the CPU 11 switches the music-related information being displayed on the music selection screen 30 to the lower layer than at present, moves to step SP208, and ends the music-related information changing operation processing procedure RT3.

On the other hand, if a negative result is obtained at step SP205, this means that the tap operation for the part outside of the mochi-cursor display region MR has been performed by the user, and the CPU 11 moves to step SP207.

At step SP207, the CPU 11 switches the music-related information being displayed on the music selection screen 30 to the upper layer than at present, moves to step SP208, and ends the music-related information changing operation processing procedure RT3.

According to the music-related information changing operation processing procedure RT3, the CPU 11 is adapted to recognize the user operation, and perform scrolling and switching of the level of detail of the music-related information being on the music selection screen 30 in response to the operation.

3-3. Operation and Effect

In the above described configuration, in the information processing device 100, the music-related information is recorded at different levels of detail with respect to each layer of folders.

When the information processing device 100 recognizes the user operation via the touch panel 3B, the device determines whether the user operation is an operation starting from within the mochi-cursor display region MR or not.

Then, if the information processing device 100 determines that the user operation is the operation starting from within the mochi-cursor display region MR, the device switches the layer of the music-related information to the upper or lower layer than at present and scrolls the music-related information in response to the user operation.

On the other hand, if the information processing device 100 determines that the user operation is the operation starting from outside of the mochi-cursor display region MR, the device performs only scrolling of the music-related information in response to the user operation.

Further, if the information processing device 100 determines that the user operation is the press and hold operation or the tap operation for a position outside of the mochi-cursor display region MR, the device performs only switching of the music-related information to the upper or lower layer than at present in response to the user operation.

Thereby, the information processing device 100 can selectively perform switching to the music-related information in the upper or lower layer than at present and scrolling of the music-related information at the same time or separately only by allowing the user to perform a simple operation of changing the start of the operation.

In addition, the information processing device 100 in the third embodiment may exert nearly the same effect as that of the information processing device 1 in the first embodiment.

According to the above described configuration, when the information processing device 100 determines that the user operation is the operation starting from within the mochi-cursor display region MR, the device scrolls the music-related information while changing the level of detail of the music-related information in response to the user operation. On the other hand, when the information processing device 100 determines that the user operation is the operation starting from the position outside of the mochi-cursor display region MR, the device performs changing of the level of detail of the music-related information or scrolling of the music-related information in response to the user operation.

Thereby, the information processing device 100 can selectively perform the changing of the level of detail of the music-related information and the scrolling of the music-related information at the same time or separately by allowing the user to perform the simple operation of changing the start of the operation. Thus, the information processing device 100 can further improve the operability.

3-4. Functional Configuration in the Third Embodiment

Here, a functional configuration of the information processing device 100 in which an emphasis is on the above described music-related information changing operation will be explained. As is the case of the information processing device 1 (FIG. 7), the information processing device 100 functions as an operation recognition part 21, a determination part 22, and a control part 23.

In the information processing device 100, the above described touch panel 3B and CPU 11 function as the operation recognition part 21. The operation recognition part 21 recognizes the user operation for the display screen of the display unit.

Further, in the information processing device 100, the above described CPU 11 functions as the determination part 22. The determination part 22 determines whether the user operation recognized by the operation recognition part 21 is an operation starting from within a predetermined region of the display screen (in this embodiment, within the mochi-cursor display region MR) or not.

Furthermore, in the information processing device 100, the above described CPU 11 functions as the control part 23. If the determination that the user operation is the operation starting from the position within predetermined region is made by the determination part 22, the control part 23 scrolls the information in response to the user operation while changing the level of detail of the information being displayed on the display screen (in this case, the music-related information). On the other hand, if the determination that the user operation is not the operation starting from within predetermined region is made by the determination part 22, the control part 23 performs the scrolling of the information or the changing of the level of detail of the information in response to the user operation.

According to the functional configuration, the information processing device 100 is adapted to be able to functionally realize the above described music-related information changing operation.

4. Other Embodiments

4-1. Another Embodiment 1

In the above described first embodiment, the CPU 11 displays the map information on the map screen 20 and performs scrolling and changing of the level of detail of the map information in response to the user operation.

Not limited to that, but the CPU 11 may display taken images taken by a digital still camera or the like, for example, and perform scrolling and changing of the level of detail of the taken images in response to the user operation.

In this case, it is assumed that plural pieces of taken image data corresponding to plural taken images are recorded in advance in the nonvolatile memory 12. When an instruction is provided to launch an application of displaying taken images by the user operation, the CPU 11 reads out the plural pieces of taken image data from the nonvolatile memory 12. Then, the CPU 11 produces a display image PE in which plural taken images PD (PD1, PD2, . . . , PDn) are longitudinally and laterally arranged without no space between them based on the plural pieces of taken image data.

Then, the CPU 11 allows the LCD 3A to display an image view screen 40 based on the display image PE. Specifically, the image view screen 40 includes a taken image display region 41 for displaying the display image PE and a mochi-cursor display region MR for displaying a mochi-cursor MC.

Here, it is assumed that the normal drag operation is performed by the user. In this regard, the CPU 11 recognizes that scrolling of the display image PE has been instructed, and scrolls the display image PE in response to the normal drag operation.

Further, it is assumed that the press and hold operation is performed on a position outside of the mochi-cursor display region MR by the user. In this regard, the CPU 11 recognizes that raising of the level of detail of the display image PE has been instructed, and the CPU raises a predetermined amount of the enlargement factor of the display image PE around the pressed and held position.

In this manner, the CPU 11 can display the image formed by enlarging the taken image PD within the display image PE on the image view screen 40 and allow the user to view the enlarged taken image PD by raising the enlargement factor of the display image PE.

On the other hand, it is assumed that the tap operation is performed on the position outside of the mochi-cursor display region MR by the user. In this regard, the CPU 11 recognizes that lowering of the level of detail of the display image PE has been instructed, and the CPU lowers a predetermined amount of the enlargement factor of the display image PE around the tapped position.

In this manner, the CPU 11 can display the plural taken images PD within the display image PE on the image view screen 40 and allow the user to view the plural taken images PD by lowering the enlargement factor of the display image PE.

Further, it is assumed that the mochi-drag operation is performed by the user. In this regard, the CPU 11 recognizes that scrolling of the display image PE while changing the level of detail of the display image PE has been instructed, and scrolls the display image PE while changing the enlargement factor of the display image PE in response to the mochi-drag operation.

As described above, when the information processing device 1 determines that the user operation is the operation starting from within the mochi-cursor display region MR, the device scrolls the images while changing the enlargement factor of the images in response to the user operation. On the other hand, when the information processing device 1 determines that the user operation is the operation starting from outside of the mochi-cursor display region MR, the device performs changing of the enlargement factor of the images or scrolling of the images in response to the user operation.

Thereby, the information processing device 1 can selectively perform the changing of the enlargement factor of the images and the scrolling of the images at the same time or separately by allowing the user to perform a simple operation of changing the start of the operation.

Further, not limited to that, but the information processing device 1 may display images of documents such as web pages and newspapers and other various images on the display screen and perform scrolling and changing of the level of detail of the images in response to the user operation.

4-2. Another Embodiment 2

In the above described first embodiment, when an instruction to change the level of detail of map information is provided by the user operation, for example, an aerial photo image PS is switched to a detailed map image PC at the higher level of detail or a map image PM at the lower level of detail than at present.

Not limited to that, the CPU 11 may switch other various images to images at the higher level of detail or images at the lower level of detail than at present in response to the user operation.

4-3. Another Embodiment 3

Furthermore, in the above described second embodiment, if the determination that the user's finger is close to near the center of the operation surface of the touch panel 53B is made, the CPU 11 displays the mochi-cursor MC on the map screen 20.

Not limited to that, the CPU 11 may display the mochi-cursor MC on the map screen 20 if the determination that the user's finger is close to the operation surface of the touch panel 53B is made, not near the center of the operation surface.

4-4. Another Embodiment 4

In the above described second embodiment, the case of using the photosensor-type touch panel 53B has been described, however, the embodiments of the invention are not limited to that, but other various types of touch panels may be used as long as the touch panel can detect the approach of the indicator.

Further, in the above described second embodiment, the case of using the user's finger as the indicator for operation of the touch panel 53B has been described. The embodiments of the invention are not limited to that, but other various types of indicators such as pencils, sticks, and special touch pens may be used as long as the touch panel can detect the approach of the indicator.

4-5. Another Embodiment 5

In the above described third embodiment, the CPU 11 displays the music-related information on the music selection screen 30 and performs scrolling and changing of the level of detail of the music-related information in response to the user operation.

Not limited to that, the CPU 11 may display content-related information related to contents of still images, moving images, or the like, for example, on the display screen and perform scrolling and changing of the level of detail of the content-related information in response to the user operation.

In this case, as long as the content-related information is managed so that the levels of detail may be hierarchically different, the information may be managed using databases, for example.

4-6. Another Embodiment 6

In the above described first to third embodiments, as an example, the mochi-cursor display region MR including a circular region having a diameter nearly equal to the thickness of a human finger around the screen center MP has been described.

The embodiments of the invention are not limited to that, but the shape, the size, the position, or the like of the mochi-cursor display region MR may be different from those of the first to third embodiments as long as the user may distinguish between the operation starting from the position within the mochi-cursor display region MR and the operation starting from the position outside of the mochi-cursor display region MR. For example, in the case where the list of the titles TN is displayed above and below the music selection screen 30 and the user is allowed to perform the vertical drag operation, the mochi-cursor display region MR may be provided at the left or the right side of the screen center MP.

Further, in the above described first to third embodiments, as an example, the semitransparent mochi-cursor MC having a circular shape has been described. The embodiments of the invention are not limited to that, but the shape, the size, the color, or the like of the mochi-cursor MC may be different from those of the first to third embodiments as long as the mochi-cursor MC indicates the position and the range of the mochi-cursor display region MR.

4-7. Another Embodiment 7

In the above described first to third embodiments, programs for executing the map information changing operation processing, the mochi-cursor display processing, and the music-related information changing operation processing are stored in the nonvolatile memory 12.

Not limited to that, but these programs may be recorded in a predetermined recording medium such as a CD (Compact Disc), for example, and the CPU 11 may readout and execute the programs from the recording medium. Further, the CPU 11 may download the programs from a predetermined server on the Internet and install them in the nonvolatile memory 12.

4-8. Another Embodiment 8

In the above described first to third embodiments, the information processing device 1, the information processing device 50, and the information processing device 100 as the information processing device is provided with the touch panel 3B and the touch panel 53B as the operation recognition part 21, and the CPU 11 as the operation recognition part 21, the determination part 22, and the control part 23.

Not limited to that, but the above described respective functional parts may be formed by other various hardware or software as long as the parts have the same functions. For example, the respective operation recognition part 21, determination part 22, and control part 23 may be formed by individual hardware. Further, regarding the operation recognition part 21, in place of the touch panel 3B, a mouse, a remote, a stereo sensor for recognition of gestures of the user may be used.

Further, as long as the information processing device has the same configuration, the embodiments of the invention may be applied to other various information processing devices such as portable audio players, PDAs (Personal Digital Assistants), and cellular phones.

4-9. Another Embodiment 9

Furthermore, the embodiments of the invention are not limited to the above described first to third embodiments and the other embodiments 1 to 8 explained so far. That is, the embodiments of the invention may be applied to a range including arbitrary combinations of part or all of the above described first to third embodiments and the other embodiments 1 to 8 explained so far or partial extractions of the embodiments. For example, the above described second embodiment and the other embodiment 1 may be combined.

The information processing device, the information processing method, and the information processing program of the embodiments of the invention may be applied to other various information processing devices such as portable audio players, PDAs, and cellular phones.

The present application contains subject matter related to that disclosed in Japanese Priority Patent Application JP 2009-115862 filed in the Japan Patent Office on May 12, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    an operation recognition part configured to recognize a user operation for a display screen of a display unit;
    a determination part configured to determine whether the user operation recognized by the operation recognition part is a pointing operation starting from a display object that is provided within a predetermined region of the display screen or not; and
    a control part configured to scroll information being displayed on the display screen while changing a level of detail of the information if the determination part determines that the user operation is the pointing operation starting from the display object provided within the predetermined region in response to the user operation, and perform either changing of the level of detail of the information or scrolling of the information if the determination part determines that the user operation is not the pointing operation starting from within the predetermined region in response to the user operation,
    wherein when the user operation is the pointing operation starting from the display object, a shape of the display object is changedly displayed on the display screen to extend from the predetermined region on the display screen to a current pointing position during the pointing operation.

2. The information processing device according to claim 1, wherein the control part displays a frame indicating the predetermined region on the display screen.

3. The information processing device according to claim 2, wherein the operation recognition part detects approach and contact of an indicator on an operation surface corresponding to the display screen, and recognizes the user operation based on a detection result, and
    the control part displays the frame indicating the predetermined region on the display screen when the approach of the indicator is detected by the operation recognition part.

4. The information processing device according to claim 1, wherein the control part scrolls map information being displayed on the display screen while changing a scale of the map information if the determination part determines that the user operation is the pointing operation starting from within the predetermined region in response to the user operation, and performs changing of the scale of the map information or scrolling of the map information if the determination part determines that the user operation is not the pointing operation starting from within the predetermined region in response to the user operation.

5. The information processing device according to claim 1, wherein the information being displayed on the display screen is content-related information related to contents managed so that the levels of detail may be hierarchically different, and
the control part switches the content-related information to an upper layer or a lower layer than at present and scrolls the content-related information if the determination part determines that the user operation is the pointing operation starting from within the predetermined region in response to the user operation, and performs switching of the content-related information to the upper layer, switching of the content-related information to the lower layer than at present, or scrolling of the content-related information if the determination part determines that the user operation is not the pointing operation starting from within the predetermined region in response to the user operation.

6. The information processing device according to claim 1, wherein the control part scrolls images being displayed on the display screen while changing an enlargement factor of the images if the determination part determines that the user operation is the pointing operation starting from within the predetermined region in response to the user operation, and performs changing of the enlargement factor of the images or scrolling of the images if the determination part determines that the user operation is not the pointing operation starting from within the predetermined region in response to the user operation.

7. The information processing device according to claim 1, wherein the control part switches images being displayed on the display screen to images at the higher level of detail or images at the lower level of detail than at present and scrolls the images if the determination part determines that the user operation is the pointing operation starting from within the predetermined region in response to the user operation, and performs switching to the images at the higher level of detail or the images at the lower level of detail than at present or scrolling of the images if the determination part determines that the user operation is not the pointing operation starting from within the predetermined region in response to the user operation.

8. An information processing method comprising the steps of:
recognizing a user operation for a display screen of a display unit by an operation recognition part;
determining whether the user operation recognized by the operation recognition part is a pointing operation starting from a display object that is provided within a predetermined region of the display screen or not by a determination part; and
scrolling information being displayed on the display screen while changing a level of detail of the information if the determination part determines that the user operation is the pointing operation starting from the display object provided within the predetermined region in response to the user operation, and performing either changing of the level of detail of the information or scrolling of the information if the determination part determines that the user operation is not the pointing operation starting from within the predetermined region in response to the user operation by a control part,
wherein when the user operation is the pointing operation starting from the display object, a shape of the display object is changedly displayed on the display screen to extend from the predetermined region on the display screen to a current pointing position during the pointing operation.

9. A non-transitory computer-readable medium embodied with a program, which when executed by a computer, causes the computer to perform an information processing method comprising:
recognizing a user operation for a display screen of a display unit by an operation recognition part;
determining whether the user operation recognized by the operation recognition part is a pointing operation starting from a display object that is provided within a predetermined region of the display screen or not by a determination part; and
scrolling information being displayed on the display screen while changing a level of detail of the information if the determination part determines that the user operation is the pointing operation starting from the display object provided within the predetermined region in response to the user operation, and performing either changing of the level of detail of the information or scrolling of the information if the determination part determines that the user operation is not the pointing operation starting from within the predetermined region in response to the user operation by a control part,
wherein when the user operation is the pointing operation starting from the display object, a shape of the display object is changedly displayed on the display screen to extend from the predetermined region on the display screen to a current pointing position during the pointing operation.

10. The information processing device according to claim 1, wherein a size of the predetermined region corresponds to an approximate thickness of a finger of a user providing the user operation.

11. The information processing device according to claim 1, wherein the predetermined region is provided substantially at a center of the display screen.

12. The information processing device according to claim 1, wherein the control part scrolls the information being displayed on the display screen in a direction corresponding to a direction of a current pointing position relative to a position of the predetermined region, and concurrently changes the level of detail of the information according to a movement speed of the current pointing position and a distance between the current pointing position and the position of the predetermined region.

13. The information processing device according to claim 12, wherein the control part lowers the level of detail of the information at a rate corresponding to at least one of the movement speed of the current pointing position and the distance between the current pointing position and the position of the predetermined region, wherein the higher the movement speed of the current pointing position or the larger the distance between the current pointing position and the position of the predetermined region, the greater the level of detail is lowered.

14. The information processing device according to claim 1, wherein the pointing operation is a single uninterrupted contact with the display screen by an operating member controlled by a user, and the pointing operation comprises a movement of a current pointing position relative to the position of the predetermined region.

15. The information processing device according to claim 14, wherein the control part lowers the level of detail of the information as a distance between the current pointing position and the position of the predetermined region is increased during the pointing operation, and raises the level of detail of the information as the distance between the current pointing position and the position of the predetermined region is decreased during the pointing operation.

16. The information processing device according to claim 15, wherein, during the pointing operation, the control part changes the level of detail of the information and concurrently scrolls the information being displayed on the display screen in a direction corresponding to a direction of the current pointing position relative to the position of the predetermined region.

17. The information processing device according to claim 1, wherein when the determination part determines that the user operation is not the pointing operation starting from within the predetermined region in response to the user operation, the control part performs a selected single function of either changing the level of detail of the information or scrolling the information.

18. The information processing device according to claim 1, wherein the control part changes the level of detail of the information by changing an image being displayed on the display screen to a new image that is of a different hierarchical level of detail.

19. The information processing device according to claim 18, wherein the control part changes the image being displayed on the display screen to the new image having either a higher level of detail or a lower level of detail, based on a characteristic of the pointing operation.

20. The information processing device according to claim 1, wherein, during the pointing operation, a single uninterrupted contact with the display screen by an operating member controlled by a user is made, and the pointing operation comprises an initial movement of a current pointing position so as to increase a distance from the position of the predetermined region to thereby change an image detail level of the information being displayed on the display screen to have a lower level of detail, and a subsequent movement of the current pointing position so as to decrease the distance from the position of the predetermined region to thereby change the image detail level of the information being displayed on the display screen to a higher level of detail while concurrently scrolling the information being displayed on the display screen in a direction corresponding to a direction of the current pointing position relative to a position of the predetermined region.

21. The information processing device according to claim 20, wherein the pointing operation navigates the information being displayed on the display screen to display or select a desired item of the information while a highest level of detail of the information is displayed on the display screen.

22. The information processing device according to claim 1, wherein the pointing operation is a drag operation.

23. The information processing device according to claim 1, wherein the shape of the display object is changed during the user operation only when the user operation is the pointing operation starting from the display object.

* * * * *